(12) United States Patent
Yagi

(10) Patent No.: US 7,762,697 B2
(45) Date of Patent: Jul. 27, 2010

(54) VEHICLE LAMP

(75) Inventor: Takayuki Yagi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 12/470,260

(22) Filed: May 21, 2009

(65) Prior Publication Data

US 2009/0290371 A1   Nov. 26, 2009

(30) Foreign Application Priority Data

May 22, 2008   (JP)   ............... 2008-134425

(51) Int. Cl.
F21V 5/00 (2006.01)
(52) U.S. Cl. .............. 362/520; 362/545; 362/522; 362/332; 362/336; 362/309
(58) Field of Classification Search ............ 362/545, 362/520, 522, 326, 327, 332, 335, 336, 308, 362/309
See application file for complete search history.

(56) References Cited

U.S. PATENT DOCUMENTS 6,929,390 B2 * 8/2005 Amano ............ 362/545
7,270,454 B2 * 9/2007 Amano ............ 362/522
7,441,929 B2 * 10/2008 Stefanov et al. ....... 362/336
7,461,960 B2 * 12/2008 Opolka et al. ........ 362/545
2004/0012976 A1 * 1/2004 Amano ............ 362/511
2006/0164839 A1 * 7/2006 Stefanov ............ 362/327

FOREIGN PATENT DOCUMENTS

JP   2005-44683   2/2005

* cited by examiner

Primary Examiner—Laura Tso
(74) Attorney, Agent, or Firm—Osha • Liang LLP

(57) ABSTRACT

A light-emitting element is disposed to face the front side such that an end point of a rectangular or square light-emitting chip corresponding to the vehicle's own lane is positioned at a rear focal point of a convex lens. An additional lens is disposed to surround the convex lens. The additional lens includes an incident surface, a reflection surface, and an emitting surface. The additional lens is divided into a plurality of fan-shaped areas in a circumferential direction with respect to an optical axis Ax. The division is performed for each angular range where a corner point of the light-emitting chip, which is positioned at an uppermost end of an image of the light-emitting chip formed on the reflection surface by the light emitted from the light-emitting element, becomes the same corner point.

13 Claims, 12 Drawing Sheets

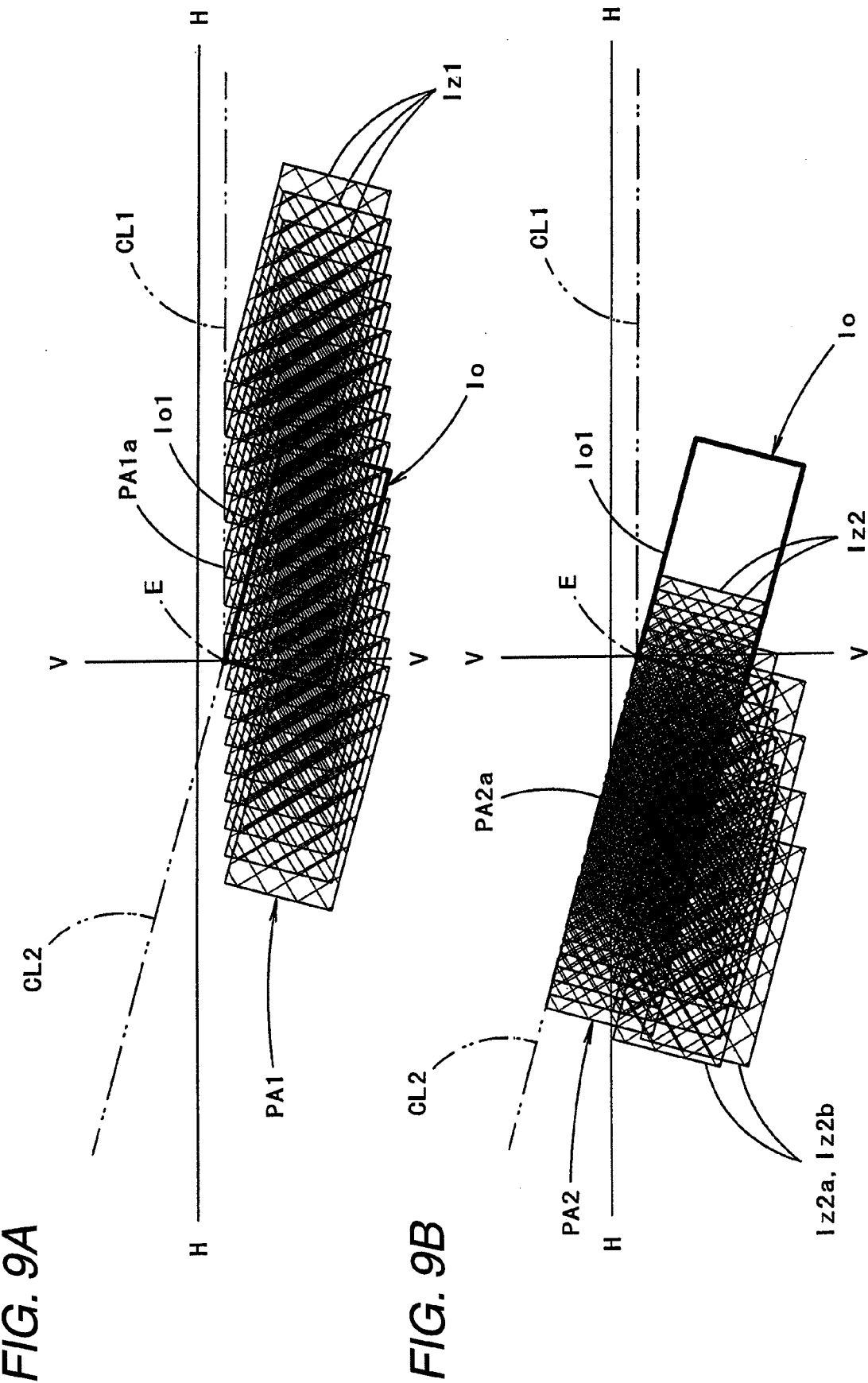

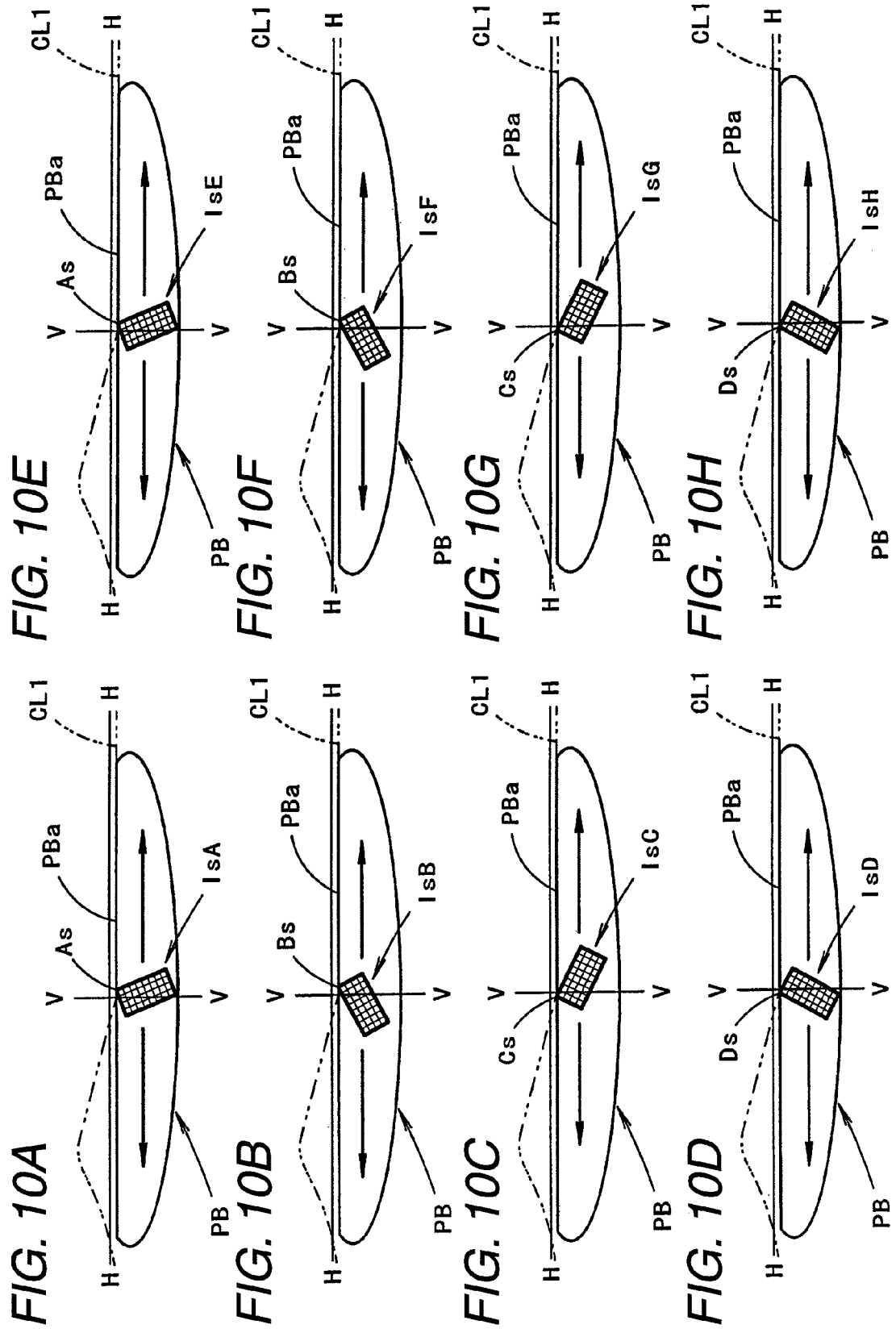

VEHICLE LAMP

CROSS-REFERENCE TO RELATED APPLICATIONS

This application claims priority from Japanese Patent Application No. 2008-134425, filed on May 22, 2008, the entire contents of which are hereby incorporated by reference.

BACKGROUND OF INVENTION

1. Field of the Invention

Devices and apparatuses consistent with the present disclosure relate to vehicle lamps that use a light-emitting element as a light source, and, more particularly, to vehicle lamps that are configured to perform light emission for forming a light-distribution pattern having a cut-off line at an upper end thereof.

2. Related Art

In recent years, a light-emitting element such as a light-emitting diode has been widely used as a light source of a vehicle lamp.

For example, JP-A-2005-44683 describes a so-called direct-projection type vehicle lamp that includes a convex lens disposed on an optical axis extending in a longitudinal direction of the vehicle lamp and a light-emitting element disposed near a rear focal point of the convex lens, and controls the deflection of direct light emitted from the light-emitting element with the convex lens.

Further, the vehicle lamp disclosed in JP-A-2005-44683, blocks a part of the direct light, which is emitted from the light-emitting element, by a shade that is disposed near the front side of the light-emitting element, and forms a light-distribution pattern that has a horizontal cut-off line or an oblique cut-off line at the upper end thereof.

If the configuration of the vehicle lamp disclosed in JP-A-2005-44683 is employed, it is possible to reduce the size of vehicle lamps. Further, if the shape of an upper edge of the shade of the vehicle lamp is appropriately designed, it is possible to form a light-distribution pattern that has horizontal and oblique cut-off lines at the upper end thereof.

However, because a part of the direct light, which is emitted from the light-emitting element, is blocked by the shade of the vehicle lamp disclosed in JP-A-2005-44683, there is a problem in that it is not possible to effectively use the luminous flux of a light source.

SUMMARY OF INVENTION

Exemplary embodiments of the present invention address the foregoing disadvantages and other disadvantages not described above. However, the exemplary embodiments of the present invention are not required to overcome the disadvantages described above and, thus, some implementations of the present invention may not overcome the specific disadvantages described above.

Accordingly, it is an aspect of the invention to provide a vehicle lamp capable of improving the use efficiency of the luminous flux of a light source in a direct-projection type vehicle lamp that uses a light-emitting element as a light source even when a light-distribution pattern having a cut-off line at an upper end thereof is formed.

According to exemplary embodiments of the present invention, a light-distribution pattern having cut-off lines at the upper end thereof is formed by controlling the deflection of direct light emitted from a light-emitting element with the convex lens, and a additional lens, which is formed integrally with a convex lens, is disposed to surround the convex lens.

According to one or more aspects of the present invention, a vehicle lamp is provided. The vehicle lamp comprises: a convex lens disposed on an optical axis extending in a longitudinal direction of a vehicle; a light-emitting element disposed near a rear focal point of the convex lens; and an additional lens disposed to surround the convex lens. Light emitted from the light-emitting element passes through the convex lens to form a light-distribution pattern having cut-off lines at the upper end thereof. The light-emitting element includes a light-emitting chip having a rectangular light-emitting surface, and is disposed to face a front side of the vehicle such that a lower edge of the light-emitting chip is positioned on a plane including the optical axis and one end point of the lower edge is positioned at the rear focal point. The additional lens includes: an incident surface where the light emitted from the light-emitting element enters the additional lens such that the light is refracted to be separated from the optical axis; a reflection surface where the light from the incident surface is internally reflected toward the front side; and an emitting surface where the light from the reflection surface is converted into horizontally diffused light and is emitted toward the front side. The additional lens is divided into a plurality of fan-shaped areas for each angular range where a corner point of the light-emitting chip corresponding to a point positioned at an uppermost end of an image of the light-emitting chip formed on the reflection surface by the light emitted from the light-emitting element becomes the same corner point. Each of the fan-shaped areas is configured to emit the light, which is emitted from the corner point, toward the front side such that the light is parallel to each other in a vertical direction of the vehicle.

The "light-emitting element" means a light source which has the shape of an element and includes a light-emitting chip for surface emission substantially in the shape of a spot. The kind of the light source is not particularly limited, for example, a light-emitting diode, a laser diode, or the like may be employed as the light-emitting element. Further, if the shape of the light-emitting surface of the "light-emitting chip" of the light-emitting element is a rectangular shape, the aspect ratio and size of the rectangular shape are not particularly limited.

The "plane including the optical axis" may be a horizontal plane or a plane inclined with respect to the horizontal plane.

The "additional lens" is disposed so as to surround the convex lens in the shape of a band. The additional lens may be disposed so as to surround the convex lens over the entire circumference of the convex lens and may be disposed to surround the convex lens over a predetermined angular range. Further, the additional lens may be formed integrally with the convex lens, and may be formed separately from the convex lens.

The "reflection surface" of the additional lens may be formed of a total reflection surface that totally reflects the light from the incident surface of the additional lens, and may be formed of a surface that is obtained by performing mirror treatment on the surface of the additional lens.

The "each of the fan-shaped areas" is configured to emit the light, which is emitted from the corner point, toward the front side such that the light that is parallel to each other in the vertical direction of the vehicle. However, the detailed configuration of the each of the fan-shaped areas is not particularly limited thereto. Further, the vertical direction of the light, which is emitted from "each of the fan-shaped areas," may correspond to the direction of the optical axis.

BRIEF DESCRIPTION OF DRAWINGS

FIGS. 8A and 8B are views separately showing the basic light-distribution pattern and the additional light-distribution pattern, wherein FIG. 8A is a view showing the basic light-distribution pattern and FIG. 8B is a view showing the additional light-distribution pattern;

FIG. 9A is a view showing a first light-distribution pattern, which forms a part of the basic light-distribution pattern, in detail;

FIG. 9B is a second light-distribution pattern, which forms other parts of the basic light-distribution pattern, in detail;

FIGS. 10A to 10H are views showing the additional light-distribution pattern and images of a light-emitting chip that are formed on the virtual vertical screen by light emitted from the fan-shaped areas when diffusing lens elements are not formed on an emitting surface of each of eight fan-shaped areas of the additional lens;

DETAILED DESCRIPTION

Exemplary embodiments of the present invention will be described below with reference to the drawings.

A first embodiment of the invention will be described first.

Figure 1:
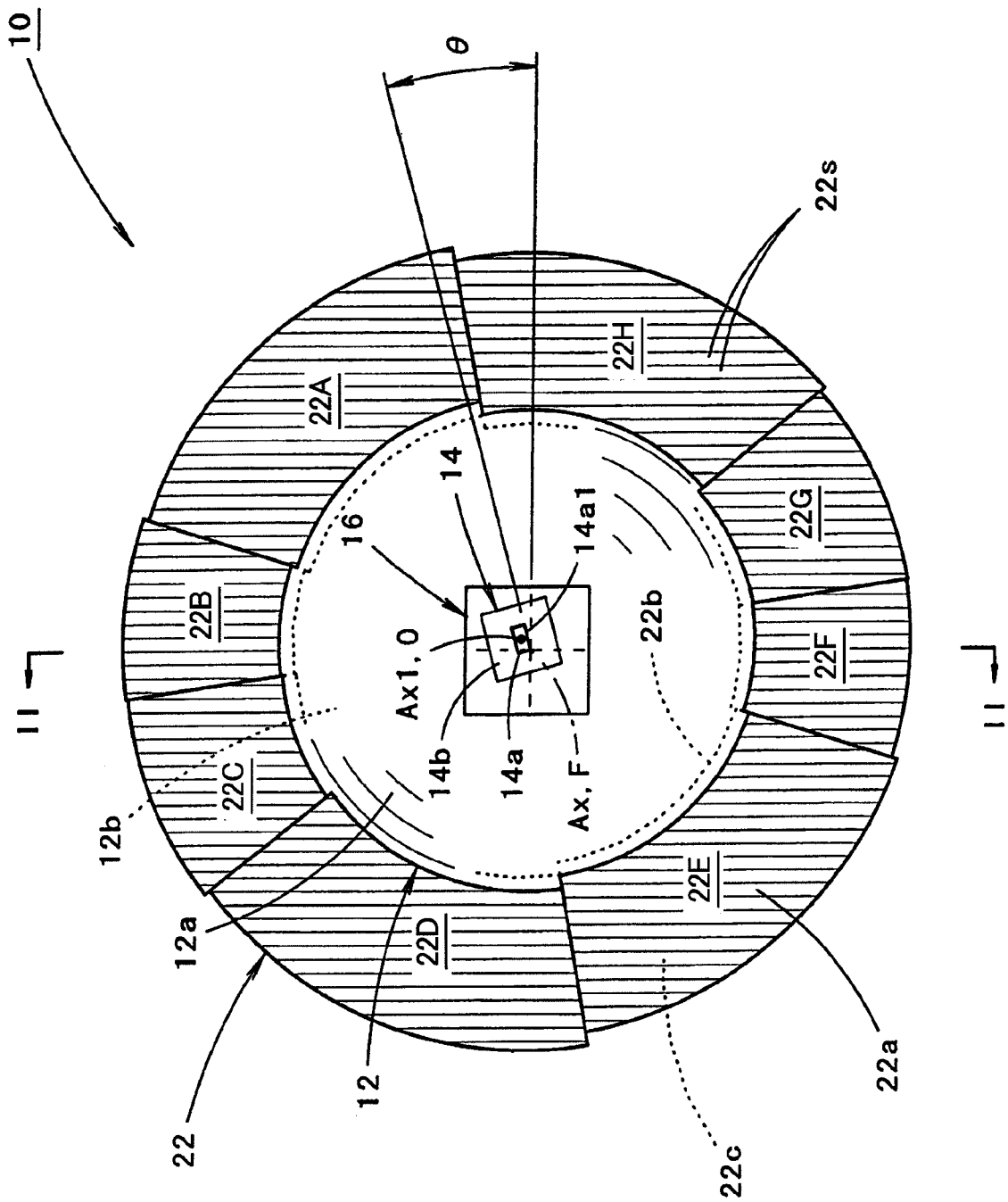
FIG. 1 is a front view of a vehicle lamp according to a first embodiment of the invention.
Figure 2:
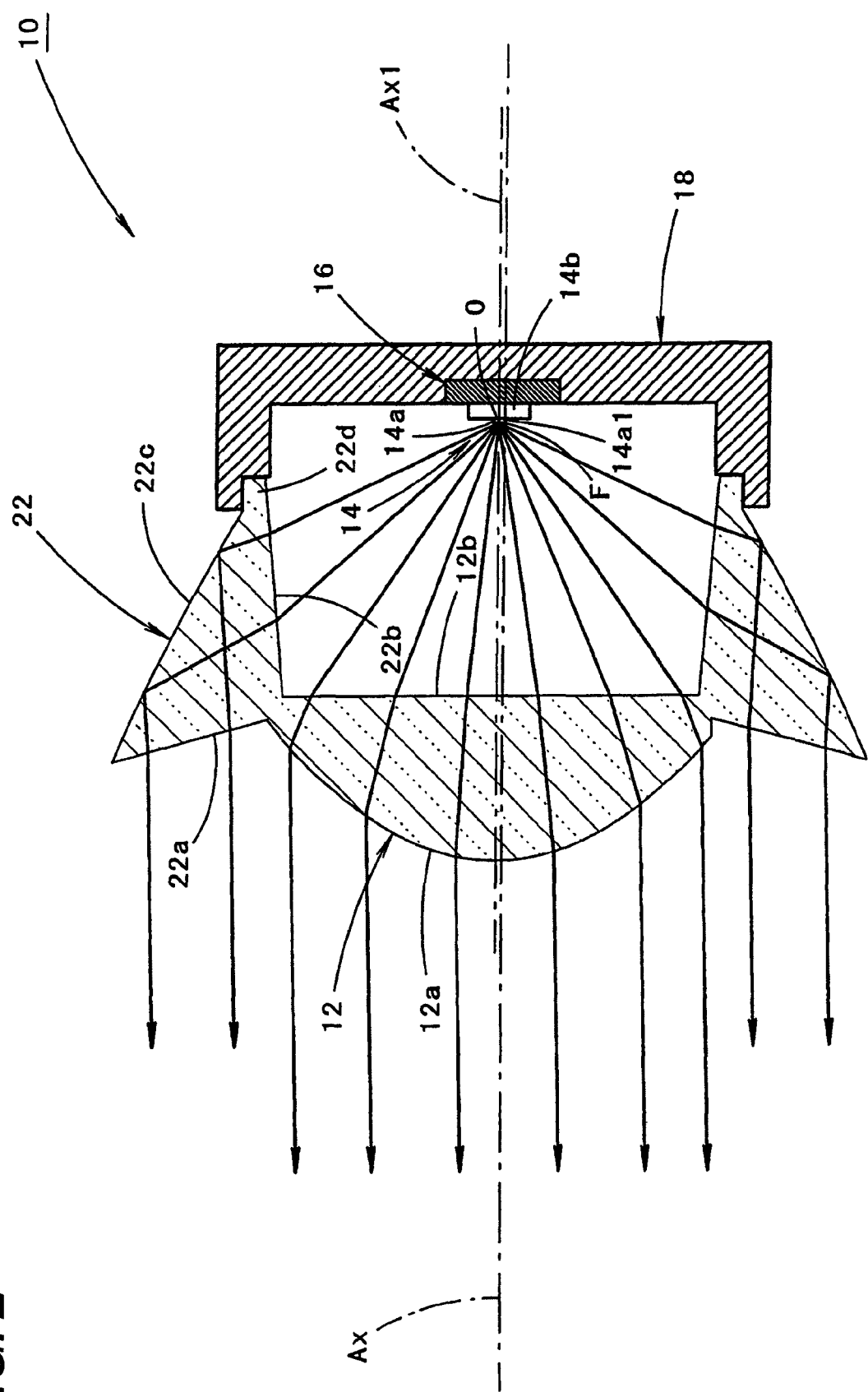
FIG. 2 is a cross-sectional view taken along a line II-II of FIG. 1.
Figure 3:
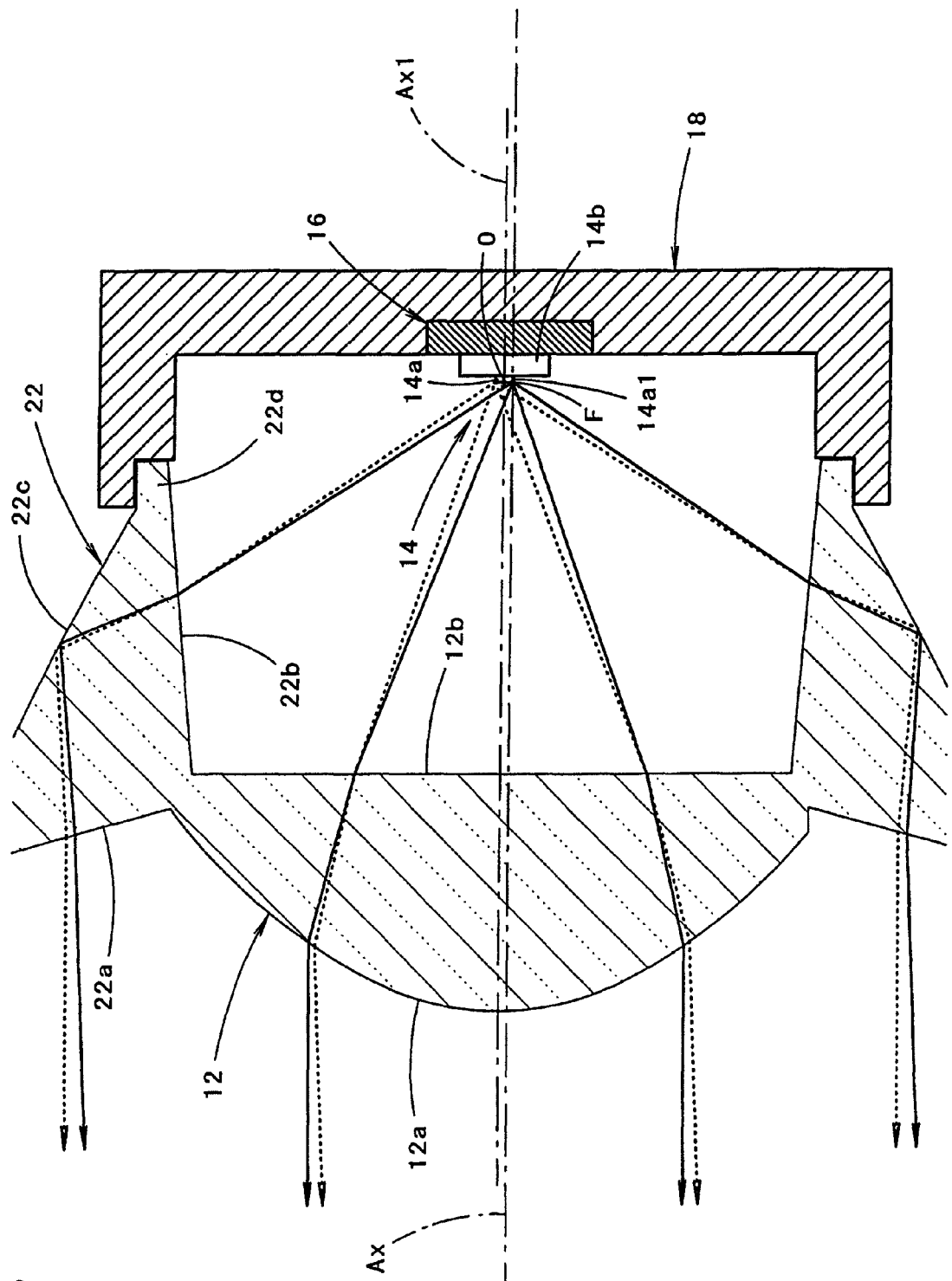
FIG. 3 is a detailed view of main parts of FIG. 2.
Figure 4:
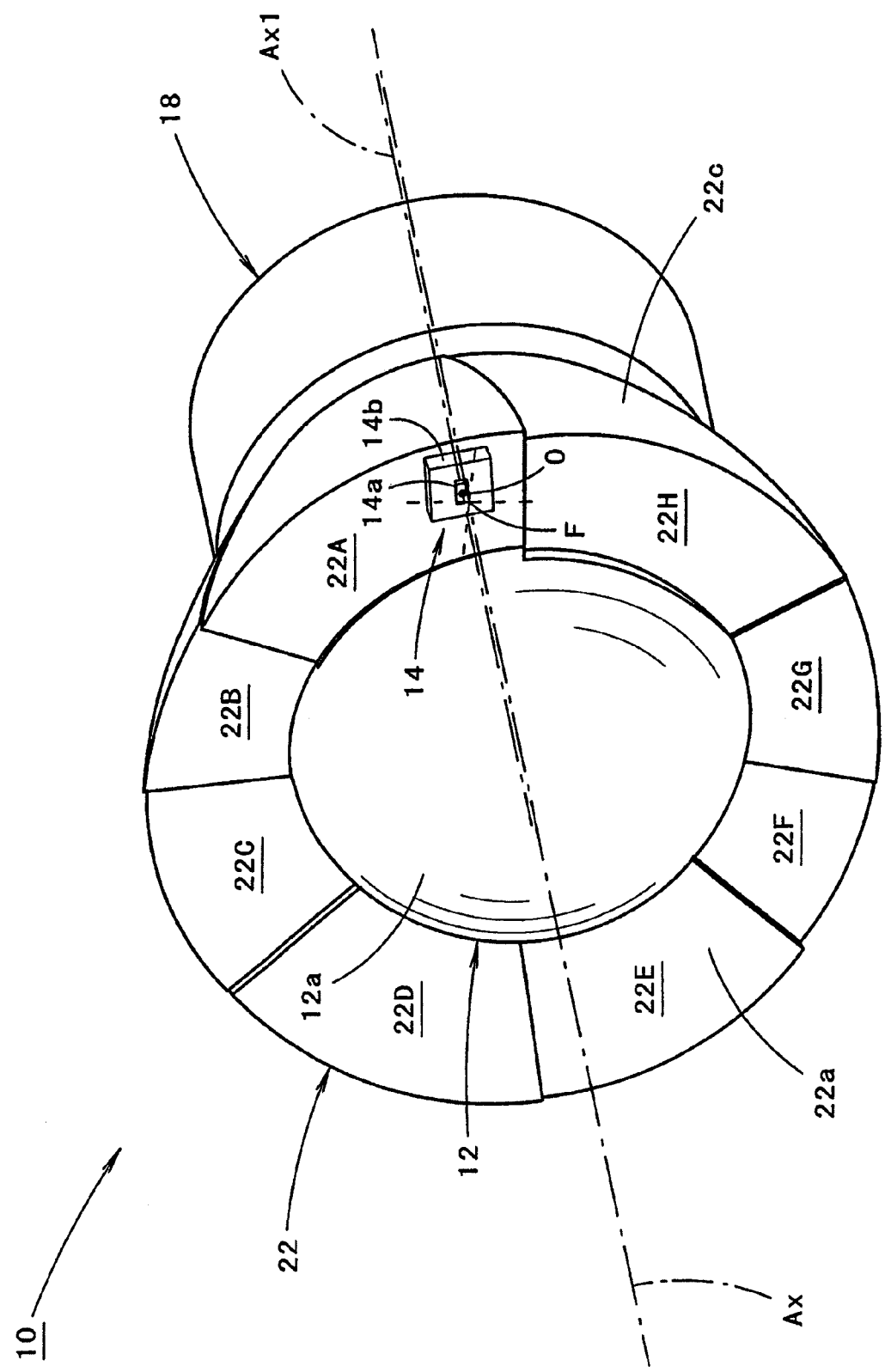
FIG. 4 is a perspective view of the vehicle lamp according to the first embodiment of the invention.

FIG. 1 is a front view of a vehicle lamp 10 according to this embodiment. FIG. 2 is a cross-sectional view taken along a line II-II of FIG. 1, and FIG. 3 is a detailed view of main parts of FIG. 2. FIG. 4 is a perspective view of the vehicle lamp 10.

As shown in these drawings, the vehicle lamp 10 according to this embodiment includes a convex lens 12 that is disposed on an optical axis Ax extending in the longitudinal direction of a vehicle, an additional lens 22 that is formed integrally with the convex lens 12 so as to surround the convex lens 12 in the shape of a band over the entire circumference of the convex lens, a light-emitting element 14 that is disposed in the vicinity of a rear focal point F of the convex lens 12, a metal plate 16 that supports the light-emitting element 14, and a support member 18 that is made of metal and positions and supports the metal plate 16 and the additional lens 22. The vehicle lamp is assembled with a lamp body (not shown) so that an optical axis of the vehicle lamp can be adjusted, and may be used as a lamp unit of a vehicle headlamp.

Further, the vehicle lamp 10 is disposed so that the optical axis Ax is inclined downward with respect to the longitudinal direction of a vehicle by an angle of about 0.5 to 0.6° when the optical axis thereof is completely adjusted.

The convex lens 12 has a convex front surface 12a and a flat rear surface 12b so that the shape thereof is similar to the planar shape of a plane-convex aspherical lens, and is disposed on the optical axis Ax. In this case, the cross section of the front surface 12a of the convex lens 12, which is taken along a vertical plane including the optical axis Ax, has the same shape as the cross section of the front surface of a plane-convex aspherical lens. However, other cross sections thereof, except for the cross section taken along the vertical plane, have the shape that is obtained by somewhat modifying the shape of the cross section of the front surface of a plane-convex aspherical lens. More precisely, the rear focal point F of the convex lens 12 means a rear focal point that is positioned on the vertical plane including the optical axis Ax. The detailed configuration of the front surface 12a of the convex lens 12 will be described below.

The light-emitting element 14 is a white light-emitting diode. The light-emitting element includes a light-emitting chip 14a that has a laterally elongated rectangular light-emitting surface (for example, a rectangular shape having a height of about 1 millimeter ("mm") and a width of about 2 mm), and a substrate 14b that supports the light-emitting chip 14a. In this case, the light-emitting chip 14a is sealed with a thin film that is formed to cover the light-emitting surface of the light-emitting chip.

The light-emitting element 14 is disposed to face the front side so that a lower edge 14a1 of the light-emitting chip 14a is positioned on an inclined plane that is inclined upward toward the vehicle's own lane (that is, toward the left side of the vehicle in the vehicle forward direction (or the right side of the vehicle as seen from the front side of the vehicle lamp)) with respect to a horizontal plane including the optical axis Ax by a predetermined angle θ (for example, θ=15°) and an end point of the lower edge 14a1 corresponding to an opposite lane is positioned at the rear focal point F of the convex lens 12.

The additional lens 22 includes an incident surface 22b, a reflection surface 22c, and an emitting surface 22a. The incident surface makes the light emitted from the light-emitting element 14 enter the additional lens 22 so that the light is refracted so as to be separated from the optical axis Ax. The reflection surface 22c internally reflects the light, which enters from the incident surface 22b, toward the front side. The emitting surface 22a emits the light, which is internally reflected by the reflection surface 22c, toward the front side as horizontally diffused light. The additional lens 22 includes an annular protrusion 22d that protrudes toward the rear side and is formed at the rear end thereof. The additional lens 22 is positioned and fixed to the support member 18 by the annular protrusion 22d. The detailed configuration of the additional lens 22 will be described below.

As shown in FIG. 3, as for the light emitted from the convex lens 12, the light emitted from the upper edge of the light-emitting chip (i.e., the light of which the light path is shown by a broken line) faces downward more so than the light emitted from the lower edge 14a1 of the light-emitting chip 14a (i.e., the light of which the light path is shown by a solid line). However, as for the light emitted from the additional lens 22, the light emitted from the lower edge 14a1 of the light-emitting chip 14a faces downward more so than the light emitted from the upper edge of the light-emitting chip.

In this case, on the reflection surface 22c of the additional lens 22, the reaching position of the light emitted from the upper edge of the light-emitting chip is positioned above the reaching position of the light emitted from the lower edge 14a1 of the light-emitting chip 14a.

The detailed configuration of the front surface 12a of the convex lens 12 will be described below.

Figure 5:
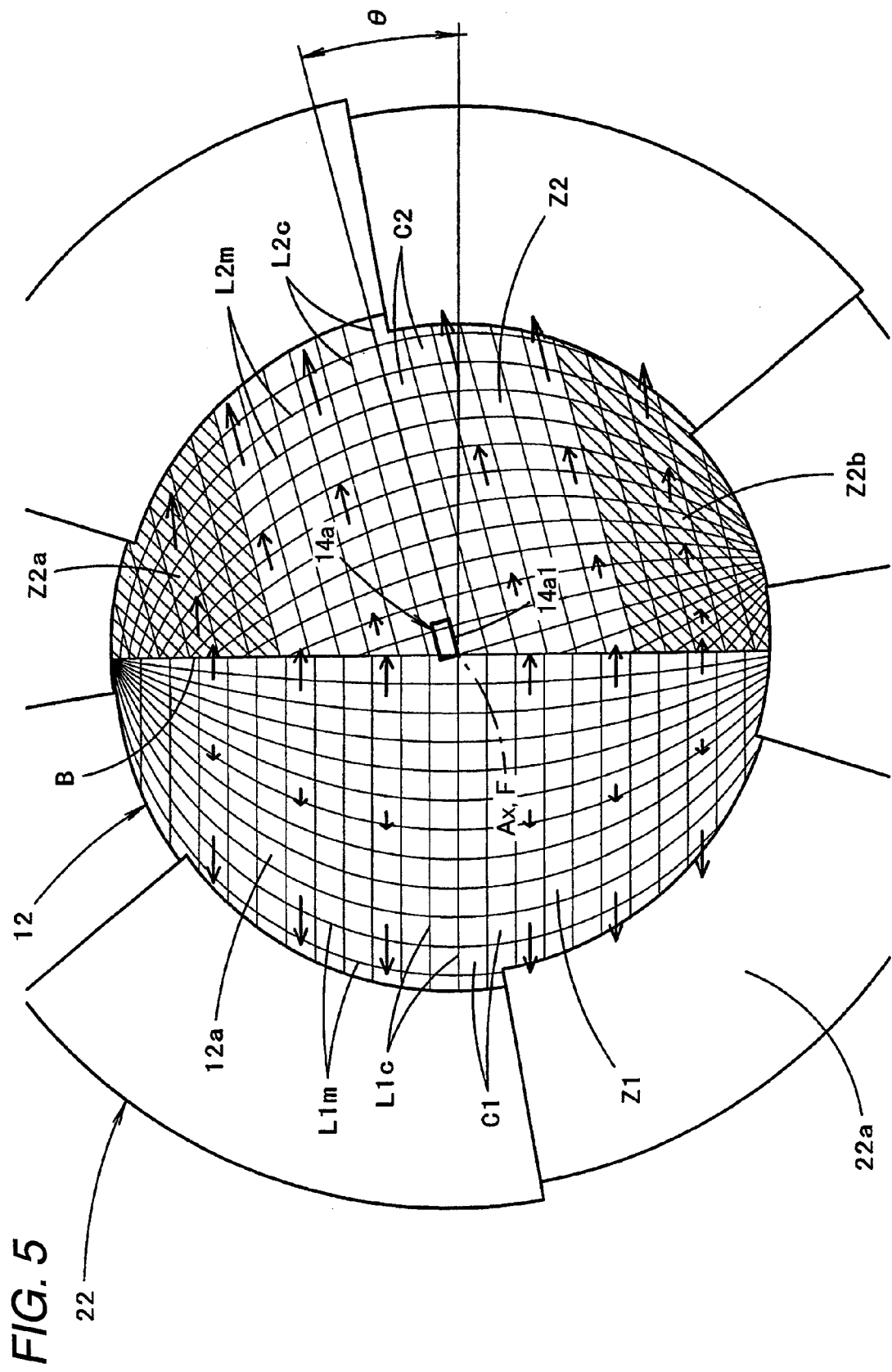
FIG. 5 is an enlarged view of main parts of FIG. 1, which shows a light-emitting chip and a convex lens of the vehicle lamp.

FIG. 5 is an enlarged view of main parts of FIG. 1, which shows the light-emitting chip 14a and the convex lens 12.

As shown in FIG. 5, the entire area of the front surface 12a of the convex lens 12, which is positioned on the side corresponding to the opposite lane with respect to the vertical plane including the optical axis Ax (that is, the right side of the vehicle in the vehicle forward direction (or the left side of the vehicle as seen from the front side of the vehicle lamp)), is formed as a horizontal diffusion area Z1. Further, the entire area of the front surface, which is positioned on the side corresponding to the vehicle's own lane with respect to the vertical plane including the optical axis Ax, is formed as an oblique diffusion area Z2.

The horizontal diffusion area Z1 is an area for emitting the light, which is emitted from the light-emitting element 14 and reaches the area Z1, as light that is diffused in the horizontal direction. Meanwhile, the oblique diffusion area Z2 is an area for emitting the light, which is emitted from the light-emitting element 14 and reaches the area Z2, as light diffused in an oblique direction that is inclined upward toward the vehicle's own lane with respect to the horizontal direction by a predetermined angle θ (for example, θ=15°).

In this case, the control of the diffusion of the light, which is emitted from the horizontal diffusion area Z1, is performed by changing the direction of the emitted light of each position of the horizontal diffusion area Z1.

That is, as shown in FIG. 5, the horizontal diffusion area Z1 is divided into a plurality of cells C1 that is formed by a plurality of curves L1c and a plurality of curves L1m. The curves L1c are arranged in a vertical direction at regular intervals and extend in the horizontal direction, and the curves L1m extend as a meridian so as to pass through the upper and lower end points of a boundary line B between the horizontal diffusion area Z1 and the oblique diffusion area Z2. A light emitting direction is set for each of the cells C1.

Specifically, as shown by arrows in FIG. 5, the direction of the emitted light faces the left side by a slightly large angle at the cells C1 close to the boundary line B, the direction of the emitted light faces the right side by a relatively large angle at the cells C1 close to the peripheral edge of the convex lens 12, and the direction of the emitted light is an intermediate direction between the above-mentioned directions at the cells C1 that are positioned between the boundary line and the peripheral edge of the convex lens. In this case, for each stage, the direction of the emitted light is gradually changed in the horizontal plane from the cells C1, which are adjacent to the boundary line B, to the cells C1, which are adjacent to the peripheral edge of the convex lens 12.

Meanwhile, like the case of the horizontal diffusion area Z1, the control of the diffusion of the light, which is emitted from the oblique diffusion area Z2, is performed by setting the direction of the emitted light of each position of the oblique diffusion area Z2.

That is, as shown in FIG. 5, the oblique diffusion area Z2 is divided into a plurality of cells C2, and a light emitting direction is set for each of the cells C2. However, curves L2c and L2m, which divide the oblique diffusion area Z2 into a plurality of cells C2, extend so as to be inclined counterclockwise with respect to the curves L1c and L1m of the horizontal diffusion area Z1 by an angle θ about the optical axis Ax as seen from the front side of the vehicle lamp.

Further, as shown by arrows in FIG. 5, the direction of the emitted light faces the left side along the curves L2c by a small angle at the cells C2 close to the boundary line B, the direction of the emitted light faces the left side by a certain large angle at the cells C2 close to the peripheral edge of the convex lens 12, and the direction of the emitted light is an intermediate direction between the above-mentioned directions at the cells C2 that are positioned between the boundary line and the peripheral edge of the convex lens.

The oblique diffusion area Z2 is formed so as to emit the light, which is emitted from the light-emitting element 14 and reaches the area Z2, as light, which is diffused toward the lower side (more precisely, the lower side with respect to the inclined plane), at upper and lower areas Z2a and Z2b (areas hatched in FIG. 13) of the oblique diffusion area. In this case, the downward deflection of the emitted light is set as large as that of the emitted light at the cells C2 close to each of the upper end point of the boundary line B and the lower end point of the curve L2m that extends to be inclined downward from the optical axis Ax.

Meanwhile, in FIG. 5, the arrow, which extends from the central position of each of the cells C1 and C2, shows the direction where the light, which enters the convex lens 12 from the end point of the lower edge 14a1 of the light-emitting chip 14a corresponding to the opposite lane (that is, from the position of the rear focal point F of the convex lens 12), is emitted from each of the cells C1 and C2.

If the front surface 12a of the convex lens 12 is formed as described above, the front surface 12a has a discontinuous surface shape at the boundary line B between the horizontal diffusion area Z1 and the oblique diffusion area Z2 and the boundary line B is formed as a ridge line.

The detailed configuration of the additional lens 22 will be described below.

As shown in FIGS. 1 to 4, the additional lens 22 is divided into eight fan-shaped areas 22A, 22B, 22C, 22D, 22E, 22F, 22G, and 22H in the circumferential direction with respect to the optical axis Ax. The cross-sectional shapes of the incident surface 22b and the reflection surface 22c of each of the eight fan-shaped areas 22A to 22H taken along a plane including an axis line Ax1, which passes through an emission center o of the light-emitting element 14 (i.e., the center of the light-emitting chip 14a as seen from the front side of the vehicle lamp) and is parallel to the optical axis Ax, are set to the same shape. Further, these eight fan-shaped areas 22A to 22H are disposed so that adjacent fan-shaped areas are shifted from the optical axis Ax in a radial direction.

Specifically, the incident surface 22b of the additional lens 22 is formed of concave and convex surfaces that are formed by shifting a substantially cylindrical rotary-curved surface, which is formed around the axis line Ax1, from the axis line Ax1 in the radial direction for each of the fan-shaped areas 22A to 22H. Further, the reflection surface 22c of the additional lens 22 is formed of concave and convex surfaces that are formed by shifting a rotary-curved surface, which is formed around the axis line Ax1, from the axis line Ax1 in the in the radial direction for each of the fan-shaped areas 22A to 22H. Furthermore, the reflection surface 22c is formed so as to internally reflect the light, which is emitted from the light-emitting element 14 and reaches the reflection surface 22c, by total reflection at the fan-shaped areas 22A to 22H.

As shown in FIG. 1, a plurality of diffusing lens elements 22s is formed on the emitting surface 22a of the additional lens 22 in the shape of a vertical stripe. The diffusing lens elements emit the light, which is emitted from the light-emitting element 14 and internally reflected by the reflection surface 22c, as horizontally diffused light. However, these diffusing lens elements 22s are not shown in FIGS. 2 to 4.

The cross-sectional shape of a curved surface, which is used as a reference when the plurality of diffusing lens elements 22s is formed on the emitting surface 22a, taken along a plane including the axis line Ax1 is set to a uniform shape for each of the eight fan-shaped areas 22A to 22H like the incident surface 22b and the reflection surface 22c. Further, the curved surface is formed of concave and convex surfaces that are shifted from the axis line Ax1 in the radial direction for each of the fan-shaped areas 22A to 22H.

Figure 6:
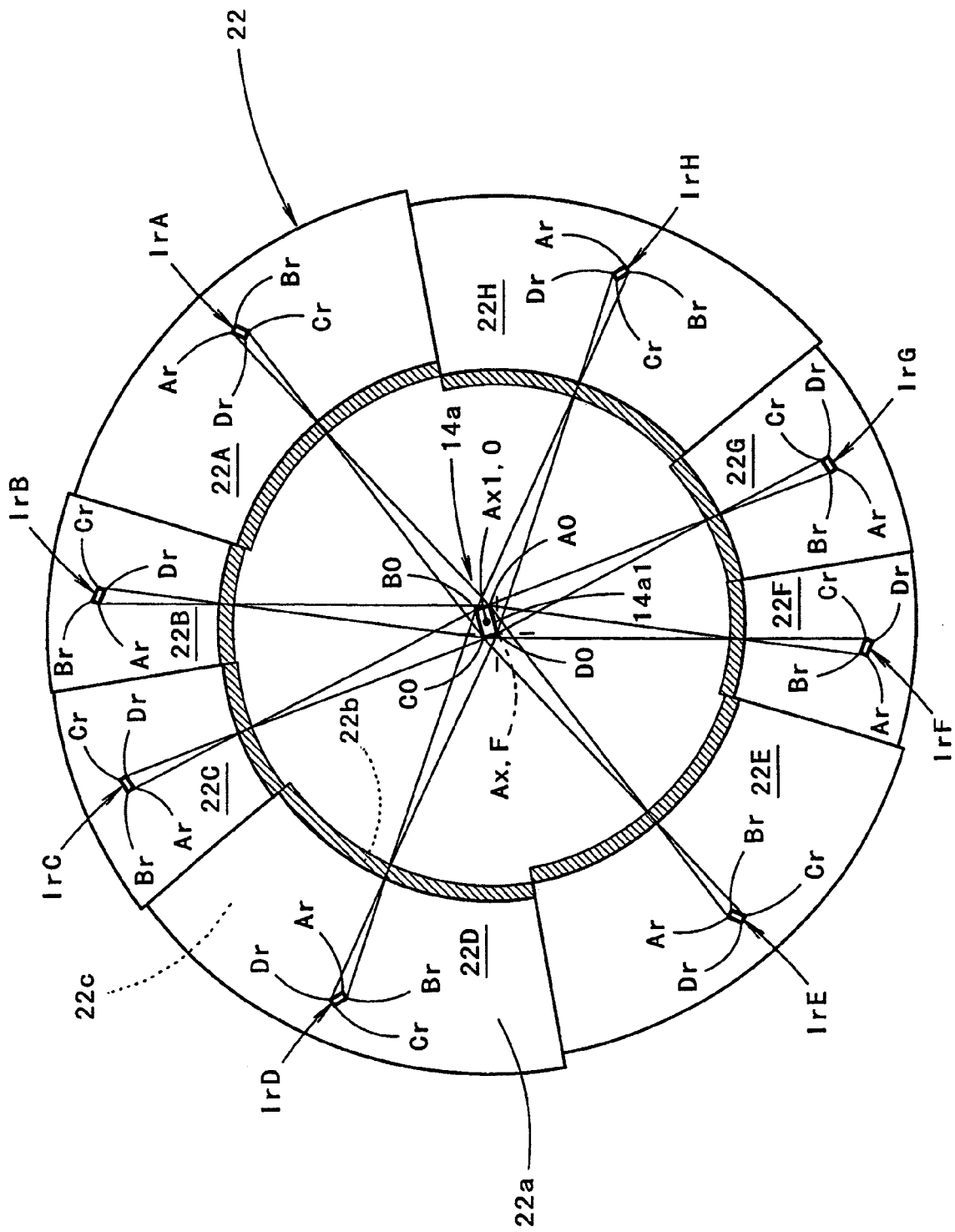
FIG. 6 is an enlarged view of main parts of FIG. 1, which shows the light-emitting chip and an additional lens of the vehicle lamp.

FIG. 6 is an enlarged view of main parts of FIG. 1, which shows the light-emitting chip 14a and the additional lens 22. However, for convenience of description, the diffusing lens elements 22s of the additional lens 22 and the convex lens 12 are not shown in FIG. 6. Meanwhile, areas hatched in FIG. 6 show that connection portions between the additional lens 22 and the convex lens 12 are cut off.

The division of the eight fan-shaped areas 22A to 22H of the additional lens 22 is performed for each angular range that is set as described below.

That is, as shown in FIG. 6, among four corner points positioned on an outer edge of the light-emitting chip 14a, an end point of the lower edge 14a1 of the outer edge corresponding to the vehicle's own lane is referred to a corner point A0, an end point of the upper edge of the outer edge corresponding to the vehicle's own lane is referred to a corner point B0, an end point of the upper edge of the outer edge corresponding to the opposite lane is referred to a corner point C0, and an end point of the lower edge 14a1 of the outer edge corresponding to the opposite lane (that is, a point positioned on the optical axis Ax) is referred to a corner point D0.

The light-emitting chip 14a has a rectangular outline. Accordingly, images IrA to IrH of the light-emitting chip 14a formed on the reflection surface 22c by the light, which is emitted from the light-emitting element 14 and reaches an arbitrary point on the incident surface 22b of the additional lens 22, have a substantially rectangular shape. Further, if these images IrA to IrH are formed at positions that are different from one another in the circumferential direction with respect to the optical axis Ax, the postures thereof are also changed.

Assuming that four points, Ar, Br, Cr, and Dr, positioned on the outer edge of each of the images IrA to IrH are points corresponding to the four corner points A0, B0, C0, and D0 of the light-emitting chip 14a, a point positioned at the uppermost end of each of the images IrA to IrH is a point Ar corresponding to the corner point A0 of the light-emitting chip 14a at the fan-shaped area 22A that is positioned at a left upper position with respect to the optical axis Ax (at a right upper position as seen from the front side of the vehicle lamp) and a point Br corresponding to the corner point B0 of the light-emitting chip 14a at the fan-shaped area 22B that is positioned substantially directly above the optical axis Ax so as to be adjacent to the fan-shaped area 22A. Further, the point positioned at the uppermost end of each of the images is a point Cr corresponding to the corner point C0 of the light-emitting chip 14a at the fan-shaped area 22C that is adjacent to the fan-shaped area 22B on the side opposite to the fan-shaped area 22A, and a point Dr corresponding to the corner point D0 of the light-emitting chip 14a at the fan-shaped area 22D that is adjacent to the fan-shaped area 22C on the side opposite to the fan-shaped area 22B.

In addition, the point positioned at the uppermost end of each of the images is again the point Ar corresponding to the corner point A0 of the light-emitting chip 14a at the fan-shaped area 22E that is adjacent to the fan-shaped area 22D on the side opposite to the fan-shaped area 22C, the point Br corresponding to the corner point B0 of the light-emitting chip 14a at the fan-shaped area 22F that is adjacent to the fan-shaped area 22E on the side opposite to the fan-shaped area 22D, again the point Cr corresponding to the corner point C0 of the light-emitting chip 14a at the fan-shaped area 22G that is adjacent to the fan-shaped area 22F on the side opposite to the fan-shaped area 22E, and the point Dr corresponding to the corner point D0 of the light-emitting chip 14a at the fan-shaped area 22H that is adjacent to the fan-shaped area 22G on the side opposite to the fan-shaped area 22F.

Further, the eight fan-shaped areas 22A to 22H are divided for each angular range so that the point positioned at the uppermost end of each of the images IrA to IrH of the light-emitting chip 14a is the same point of the four points, Ar, Br, Cr, and Dr. As a result of the above-mentioned division, each of the four fan-shaped areas 22B, 22C, 22F, and 22G, which are positioned at positions substantially corresponding to the both the upper and lower edges of the light-emitting chip 14a, has a relatively small central angle. Each of the other four fan-shaped areas 22A, 22D, 22E, and 22H has a relatively large central angle.

As described above, these eight fan-shaped areas 22A to 22H are disposed so that adjacent fan-shaped areas are shifted from the axis line Ax1 in the radial direction. However, the shift amount in the case is set to a predetermined value so that the light, which is emitted from the corner point of the light-emitting chip 14a corresponding to the point positioned at the uppermost end of each of the images IrA to IrH of the light-emitting chip 14a formed on the reflection surface 22c, is emitted toward the front side as the light that is parallel to one another in the vertical direction among the fan-shaped areas 22A to 22H.

That is, if each of the eight fan-shaped areas 22A to 22H is not shifted from the axis line Ax1 in the radial direction, the position of the image of the light-emitting chip 14a, which is formed by the emitted light on the virtual vertical screen positioned ahead of the vehicle lamp, varies in the vertical direction for each of the fan-shaped areas 22A to 22H. In contrast, if each of the eight fan-shaped areas 22A to 22H is shifted from the axis line Ax1 in the radial direction, the position of the image of the light-emitting chip 14a formed on the virtual vertical screen is changed in the vertical direction (and the horizontal direction) according to the shift. In this case, according to this embodiment, the shift amount in the radial direction is set to a predetermined value so that the light, which is emitted from the corner point of the light-emitting chip 14a corresponding to the point positioned at the uppermost end of each of the images IrA to IrH of the light-emitting chip 14a formed on the reflection surface 22c, is emitted toward the front side as the light that is parallel to one another in the vertical direction among the fan-shaped areas 22A to 22H. Accordingly, all the positions of the upper ends of the images of the light-emitting chip 14a, which are formed on the virtual vertical screen by the light emitted from the fan-shaped areas 22A to 22H, are unified.

The light, which is emitted from the light-emitting element 14 and internally reflected by the reflection surface 22c, is emitted as the horizontally diffused light by the plurality of diffusing lens elements 22s that are formed on the emitting surface 22a of the additional lens 22. Accordingly, a plurality of laterally elongated light-distribution patterns, which have horizontal cut-off lines at the upper portions thereof, is formed on the virtual vertical screen by the light emitted from the fan-shaped areas 22A to 22H so that the positions of the upper ends of the images are unified.

Figure 7:
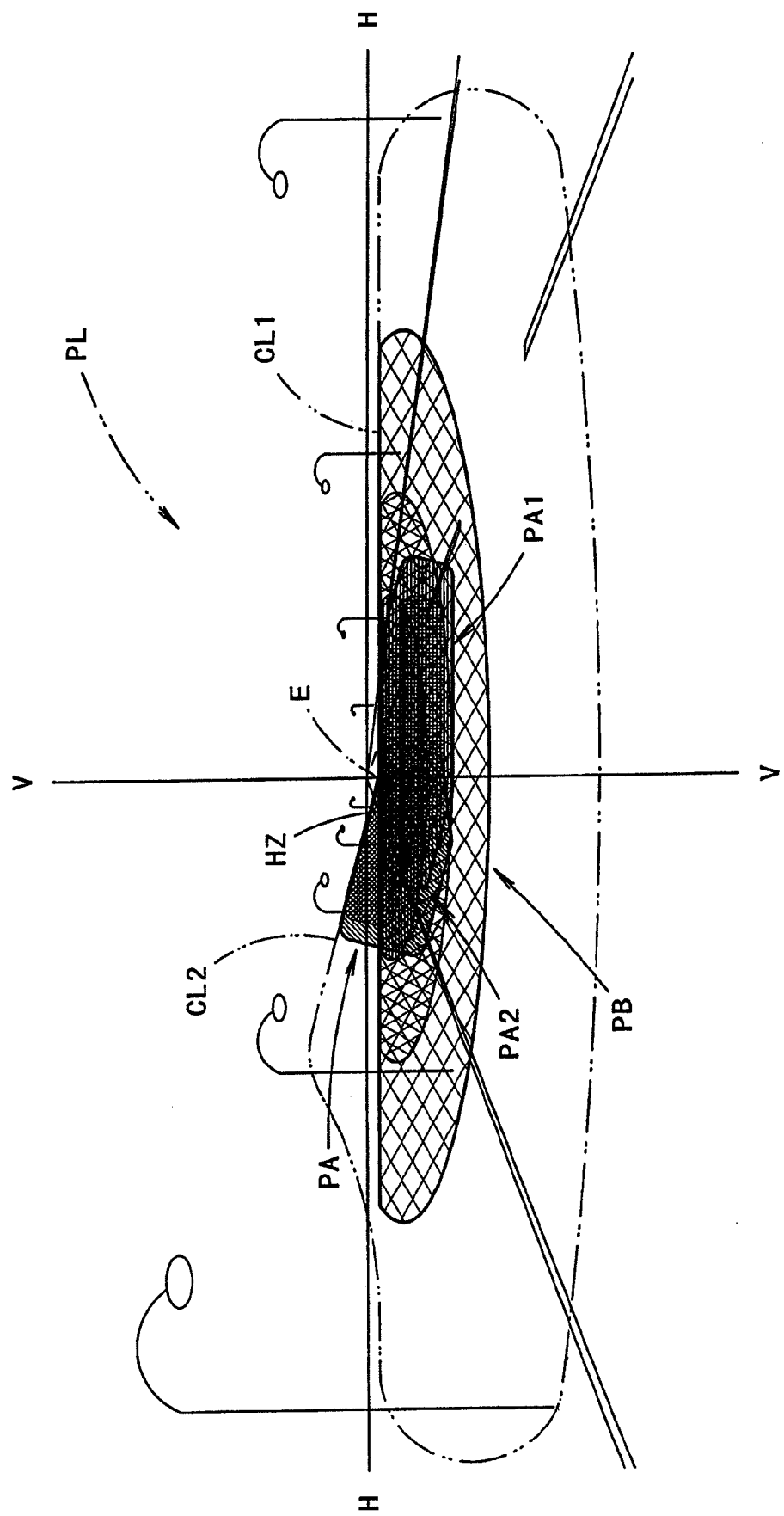
FIG. 7 is a perspective view showing a basic light-distribution pattern and an additional light-distribution pattern formed on a virtual vertical screen, which is positioned 25 meters ahead of the vehicle lamp, by light emitted forward from the vehicle lamp.

FIG. 7 is a perspective view showing a basic light-distribution pattern PA and an additional light-distribution pattern PB formed on a virtual vertical screen, which is positioned 25 meters ahead of the vehicle lamp, by light emitted forward from the vehicle lamp 10 according to this embodiment.

As shown in FIG. 7, the basic light-distribution pattern PA and the additional light-distribution pattern PB are formed as a part of a low-beam light-distribution pattern PL that is shown by a two-dot chain line. In this case, the basic light-distribution pattern PA is a light-distribution pattern that is formed by the light emitted from the convex lens 12. Meanwhile, the additional light-distribution pattern PB is a light-distribution pattern that is formed by the light emitted from the additional lens 22. Further, the low-beam light-distribution pattern PL is formed as a composite light-distribution pattern that is obtained by combining the basic light-distribution pattern PA and the additional light-distribution pattern PB with a light-distribution pattern formed by light emitted forward from another lamp unit (not shown).

The low-beam light-distribution pattern PL is a low-beam light-distribution pattern for left light distribution, and has horizontal and oblique cut-off lines CL1 and CL2 at the upper end thereof. In this case, with respect to a V-V line that is a vertical line passing through H-V, that is, a vanishing point in the front direction of the vehicle lamp, the horizontal cut-off line CL1 is formed on the side corresponding to the opposite lane and the oblique cut-off line CL2 is formed on the side corresponding to the vehicle's own lane. An elbow point E, which is an intersection between the both cut-off lines CL1 and CL2, is positioned below H-V, which is the vanishing point in the front direction of the vehicle lamp, by an angle of about 0.5 to 0.6°. Further, a hot zone HZ, which is an area having high luminosity, is formed near the left portion on the low-beam light-distribution pattern PL so as to surround the elbow point E.

Figure 8A:
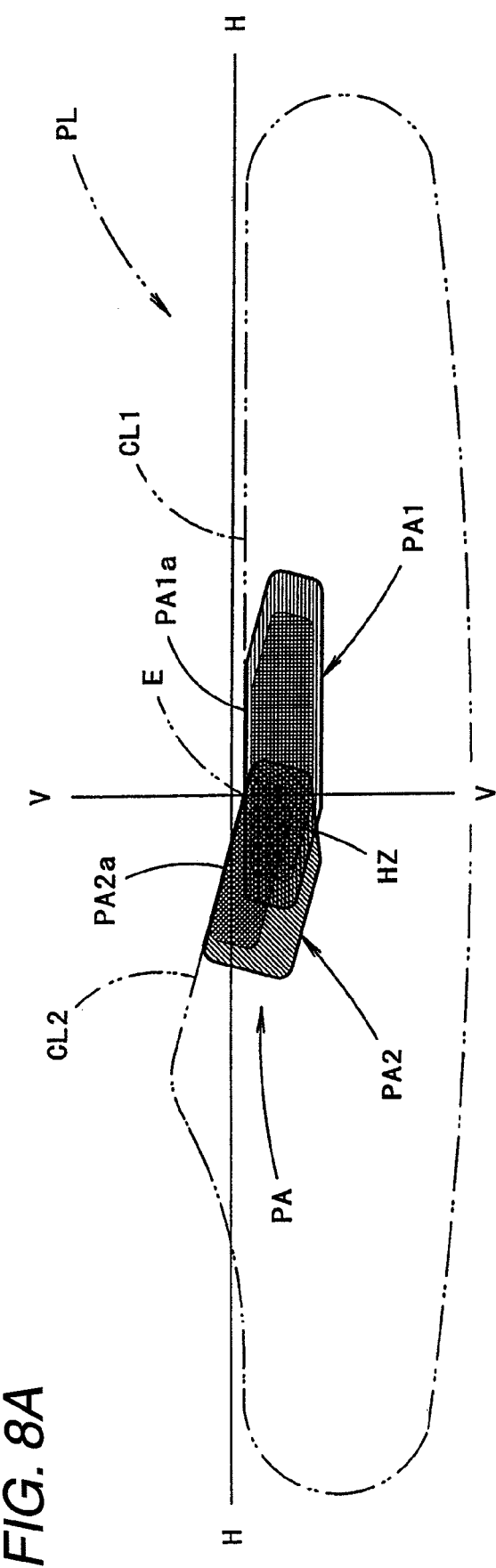
Figure 8B:
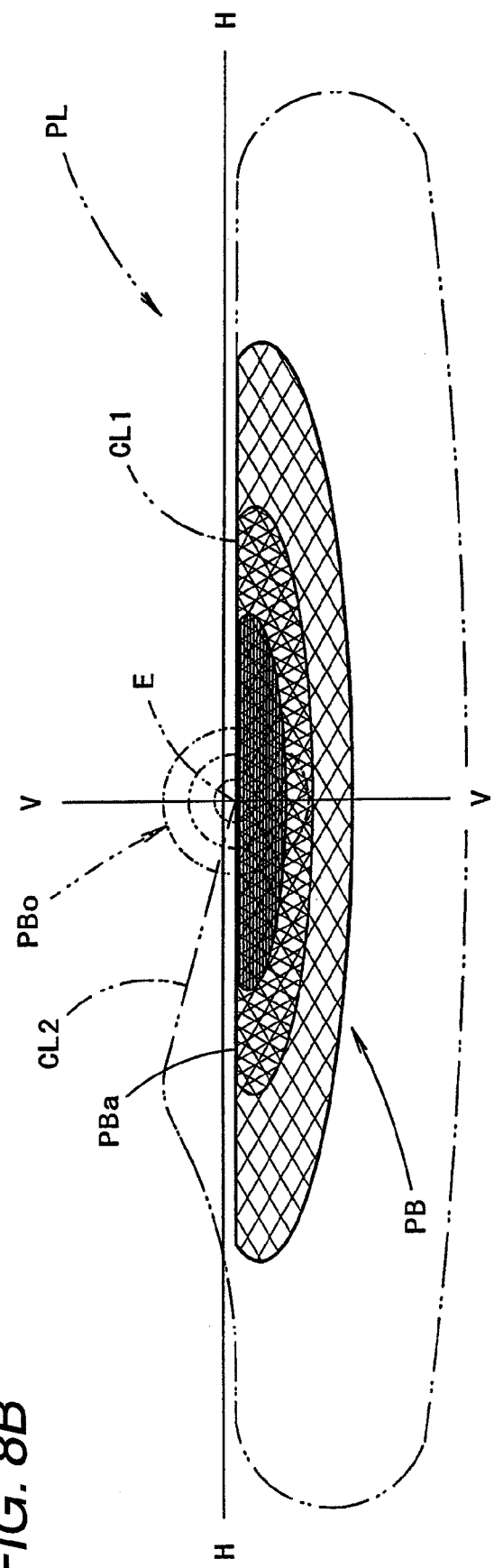

FIGS. 8A and 8B are views separately showing the basic light-distribution pattern PA and the additional light-distribution pattern PB, wherein FIG. 8A is a view showing the basic light-distribution pattern PA and FIG. 8B is a view showing the additional light-distribution pattern PB.

The basic light-distribution pattern PA will be described first.

As shown in FIG. 8A, the basic light-distribution pattern PA is formed as a composite light-distribution pattern that is obtained by combining a first light-distribution pattern PA1 with a second light-distribution pattern PA2.

The light-distribution pattern PA1 is a light-distribution pattern that is formed by the light emitted from the horizontal diffusion area Z1 on the front surface 12a of the convex lens 12, and is formed so that the upper edge of the light-distribution pattern PA1 is substantially aligned with the horizontal cut-off line CL1. Meanwhile, the light-distribution pattern PA2 is a light-distribution pattern that is formed by the light emitted from the oblique diffusion area Z2 on the front surface 12a of the convex lens 12, and is formed so that the upper edge of the light-distribution pattern PA2 is substantially aligned with the oblique cut-off line CL2. Further, the hot zone HZ of the low-beam light-distribution pattern PL is mainly formed of an overlapping portion between the two light-distribution patterns PA1 and PA2.

FIG. 9A is a view showing the light-distribution pattern PA1 in detail, and FIG. 9B is a view showing the light-distribution pattern PA2 in detail.

If the convex lens 12 is a common plane-convex aspherical lens as shown in FIGS. 9A and 9B, a reverse projection image Io of the light-emitting chip 14a is formed so that the end point of an upper edge Io1 of the reverse projection image corresponding to the vehicle's own lane is positioned at a position of the elbow point E (that is, the intersection between the virtual vertical screen and the optical axis Ax) on the virtual vertical screen and the upper edge Io1 thereof is positioned on the extension line of an inclined line that is inclined upward toward the vehicle's own lane with respect to a horizontal line passing through the elbow point E by a predetermined angle θ. The reason for this is that the lower edge 14a1 of the light-emitting chip 14a is positioned on an inclined plane that is inclined upward toward the vehicle's, own lane with respect to the horizontal plane including the optical axis Ax by a predetermined angle θ (for example, θ=15°) and the end point of the lower edge 14a1 thereof corresponding to the opposite lane is positioned at the rear focal point F of the convex lens 12.

The area of the front surface 12a of the convex lens 12, which is positioned on the side corresponding to the opposite lane with respect to a vertical plane including the optical axis Ax thereof, is formed as the horizontal diffusion area Z1. Further, the area of the front surface of the convex lens, which is positioned on the side corresponding to the vehicle's own lane, is formed as the oblique diffusion area Z2. Accordingly, the light-distribution pattern PA1 extending in the horizontal direction is formed on the virtual vertical screen by the light emitted from the horizontal diffusion area Z1. Further, the light-distribution pattern PA2, which is formed by making the reverse projection image Io extend in an oblique direction inclined upward toward the vehicle's own lane with respect to the horizontal direction by a predetermined angle θ, is formed on the virtual vertical screen by the light emitted from the oblique diffusion area Z2.

FIGS. 9A and 9B show the spread appearance of the light-distribution pattern PA1 while a plurality of reverse projection images Iz1 overlaps.

The light-distribution pattern PA1 is formed as a light-distribution pattern that is obtained by elongating the reverse projection image Io of the light-emitting chip 14a to both left and right sides in the horizontal direction. In this case, because a direction where the upper edge Io1 of the reverse projection image Io extends does not correspond to a direction where the reverse projection image Io is elongated, the upper edge PA1a of the light-distribution pattern PA1 does not have the contrast ratio as high as the upper edge PA2a of the light-distribution pattern PA2 to be described below, but can secure definition sufficient to be recognized as the horizontal cut-off line CL1.

Meanwhile, FIG. 9B shows the spread appearance of the light-distribution pattern PA2 while a plurality of reverse projection images Iz2, Iz2a, and Iz2b overlaps.

The light-distribution pattern PA2 is formed as a light-distribution pattern that is formed by elongating the reverse projection image Io of the light-emitting chip 14a while deflecting the reverse projection image to the left side in the oblique direction. In this case, the upper edge Io1 of the reverse projection image Io is positioned on the extension line of the inclined line that is inclined upward toward the vehicle's own lane with respect to the horizontal line passing through the elbow point E by a predetermined angle θ. Accordingly, the upper edge PA2a of the light-distribution pattern PA2 has an extremely high contrast ratio, so that the oblique cut-off line CL2 has high definition.

The reverse projection images Iz2a and Iz2b, which are formed by the light emitted from the upper and lower areas Z2a and Z2b of the oblique diffusion area Z2, of the plurality of reverse projection images Iz2 forming the light-distribution pattern PA2 are positioned slightly below the oblique cut-off line CL2. The reason for this is that the light emitted from the upper and lower areas Z2a and Z2b is light diffused downward.

The additional light-distribution pattern PB will be described below.

As shown in FIG. 8B, the additional light-distribution pattern PB is formed as a laterally elongated light-distribution pattern that thinly extends to both left and right sides from the V-V line as a center below and near the horizontal cut-off line CL1. In this case, the additional light-distribution pattern PB is formed so that the upper edge PBa of the additional light-distribution pattern is positioned at substantially the same height as the horizontal cut-off line CL1 and extends in the horizontal direction.

The additional light-distribution pattern PB is a light-distribution pattern that is formed by dividing a reference light-distribution pattern PBo, which is shown by a two-dot chain line in FIG. 8B, into eight patterns and expanding the patterns to both left and right sides in the horizontal direction after displacing downward the patterns by a predetermined distance.

Here, the reference light-distribution pattern PBo is a light-distribution pattern. This light-distribution pattern is formed when the additional lens 22 is not divided into eight fan-shaped areas 22A to 22H and the emitting surface 22a of the additional lens is formed of a curved surface (that is, a curved surface rotationally symmetrical with respect to the axis line Ax1) formed so that the light, which is internally reflected by the reflection surface 22c and reaches the emitting surface 22a, is emitted as light parallel to the axis line Ax1. The reference light-distribution pattern is formed as a light-distribution pattern that has the shape of a spot having the elbow point E as a center.

The additional lens 22 is divided into eight fan-shaped areas 22A to 22H and a plurality of diffusing lens elements 22s is formed on the emitting surface 22a of the additional lens. Accordingly, the additional light-distribution pattern PB has the shape where the reference light-distribution pattern PBo is expanded to both left and right sides in the horizontal direction after being displaced downward. Further, the additional light-distribution pattern is formed as a laterally elongated light-distribution pattern that is formed below and near the horizontal cut-off line CL1, has a relatively small width in the vertical direction, and is relatively bright.

In this case, the reason why the upper edge PBa of the additional light-distribution pattern PB extends in the horizontal direction at substantially the same height as the horizontal cut-off line CL1 is that the positions of the upper ends of the images of the light-emitting chip 14a formed on the virtual vertical screen are unified for the fan-shaped areas 22A to 22H as described above.

FIGS. 10A to 10H are views showing the additional light-distribution pattern PB and images IsA to IsH of the light-emitting chip 14a that are formed on the virtual vertical screen by light emitted from the fan-shaped areas 22A to 22H when the diffusing lens elements 22s are not formed on the emitting surface 22a of each of eight fan-shaped areas 22A to 22H.

As shown in FIG. 10A, a point As of the upper end of the image IsA of the light-emitting chip 14a, which is formed by the light emitted from the fan-shaped area 22A, is positioned at the same height as the horizontal cut-off line CL1. In this case, the point As of the upper end of the image IsA is a point corresponding to the point Ar that is positioned at the uppermost end of the image IrA of the light-emitting chip 14a formed on the reflection surface 22c of the additional lens 22.

Likewise, as shown in FIGS. 10B to 10H, the points, Bs, Cs, Ds, As, Bs, Cs, and Ds, of the upper ends of the images, IsB, IsC, IsD, IsE, IsF, IsG, and IsH, of the light-emitting chip 14a, which are formed by the light emitted from the other seven fan-shaped areas 22B, 22C, 22D, 22E, 22F, 22G, and 22H, are also positioned at the same height as the horizontal cut-off line CL1. In this case, the points, Bs, Cs, Ds, As, Bs, Cs, and Ds, of the upper ends of the images, IsB, IsC, IsD, IsE, IsF, IsG, and IsH, are points corresponding to the points, Ar, Br, Cr, Dr, Ar, Br, Cr, and Dr, that are positioned at the uppermost ends of the images, IrA, IrB, IrC, IrD, IrE, IrF, IrG, and IrH, of the light-emitting chip 14a formed on the reflection surface 22c of the additional lens 22.

The points, As to Ds, of the upper ends of the images, IsA to IsH, of the light-emitting chip 14a, which are formed by the light emitted from the fan-shaped areas 22A to 22H as described above, are unified at the same height as the horizontal cut-off line CL1. The reason for this is that the shift amount of each of the eight fan-shaped areas 22A to 22H from the axis line Ax1 in the radial direction is set to a predetermined value so that the light, which is emitted from the corner points, A0 to D0, of the light-emitting chip 14a corresponding to the points, Ar to Dr, positioned at the uppermost ends of the images, IrA to IrH, of the light-emitting chip 14a formed on the reflection surface 22c, is emitted toward the front side as the light that is parallel to one another in the vertical direction among the fan-shaped areas 22A to 22H.

The additional light-distribution pattern PB is formed by expanding these eight images, IsA to IsH, of the light-emitting chip 14a to both left and right sides in the horizontal direction as shown by arrows of FIGS. 10A to 10H by the horizontal diffusing function of the plurality of diffusing lens elements 22s formed on the emitting surface 22a.

Further, the additional light-distribution pattern PB is formed to partially overlap the basic light-distribution pattern PA as shown in FIG. 7, so that the brightness of a portion of the low-beam light-distribution pattern PL near the hot zone HZ is improved and a horizontal cut-off line CL1 having high definition is formed.

As described above, the vehicle lamp 10 according to this embodiment forms the basic light-distribution pattern PA, which has horizontal and oblique cut-off lines CL1 and CL2 at the upper end thereof, as a part of the low-beam light-distribution pattern PL by controlling the deflection of direct light emitted from the light-emitting element 14, which includes the light-emitting chip 14a having a rectangular light-emitting surface, with the convex lens 12. However, the light-emitting element 14 is disposed to face the front side so that the lower edge 14a1 of the light-emitting chip 14a is positioned on an inclined plane that is inclined upward toward the vehicle's own lane with respect to a horizontal plane including the optical axis Ax by a predetermined angle θ and an end point of the lower edge 14a1 corresponding to the opposite lane is positioned at the rear focal point F of the convex lens 12. Further, a part of the area of the front surface 12a of the convex lens 12 is formed as the horizontal diffusion area Z1, and the other part of the area thereof is formed as the oblique diffusion area Z2. Accordingly, it is possible to obtain the following advantages.

Because the light-emitting element 14 is disposed in the vicinity of the rear focal point F of the convex lens 12 so as to face the front side, the reverse projection image Io of the light-emitting chip 14a is formed on the virtual vertical screen that is positioned ahead of the vehicle lamp. However, in this case, the lower edge 14a1 of the light-emitting chip 14a of the light-emitting element is positioned on an inclined plane that is inclined upward toward the vehicle's own lane with respect to a horizontal plane including the optical axis Ax by a predetermined angle θ, and an end point of the lower edge 14a1 corresponding to the opposite lane is positioned at the rear focal point F of the convex lens 12. Accordingly, if the convex lens 12 is a common plane-convex aspherical lens, the reverse projection image Io of the light-emitting chip 14a is formed so that the end point of the upper edge Io1 of the reverse projection image corresponding to the opposite lane is positioned at the intersection (that is, H-V) between the virtual vertical screen and the optical axis Ax on the virtual vertical screen and the upper edge Io1 thereof is positioned on the extension line of an inclined line that is inclined upward toward the vehicle's own lane with respect to a horizontal line passing through the intersection by a predetermined angle θ.

A part of the area of the front surface 12a of the convex lens 12 is formed as the horizontal diffusion area Z1 for emitting the light, which is emitted from the light-emitting element 14 and reaches the area, as light that is diffused in the horizontal direction. The other part of the area thereof is formed as the oblique diffusion area Z2 for emitting the light, which is emitted from the light-emitting element 14 and reaches the area, as light diffused in an oblique direction that is inclined upward toward the vehicle's own lane with respect to the horizontal direction by a predetermined angle θ. Accordingly, the light-distribution pattern PA1 extending in the horizontal direction is formed on the virtual vertical screen by the light emitted from the horizontal diffusion area Z1. Further, the light-distribution pattern PA2 extending in an oblique direction, which is inclined upward toward the vehicle's own lane with respect to the horizontal direction by a predetermined angle θ, is formed on the virtual vertical screen by the light emitted from the oblique diffusion area Z2.

The basic light-distribution pattern PA, which has horizontal and oblique cut-off lines CL1 and CL2 at the upper end thereof, is formed as a composite light-distribution pattern of the light-distribution patterns PA1 and PA2.

In this case, the light-distribution pattern PA2 is formed as a light-distribution pattern that makes the reverse projection image Io of the light-emitting chip 14a be elongated in an oblique direction inclined upward toward the vehicle's own lane with respect to the horizontal direction by a predetermined angle θ. However, the lower edge 14a1 of the light-emitting chip 14a extends in the oblique direction, which is inclined upward from the rear focal point F of the convex lens 12 toward the vehicle's own lane with respect to the horizontal direction by a predetermined angle θ. Accordingly, the upper edge PA2a of the light-distribution pattern PA2 has an extremely high contrast ratio, so that the oblique cut-off line CL2 may have high definition.

In addition, according to this embodiment, it is possible to form the horizontal and oblique cut-off lines CL1 and CL2 without blocking a part of the direct light emitted from the light-emitting element 14 by a shade unlike in the related art. Accordingly, it is possible to effectively use the luminous flux of a light source.

In particular, according to this embodiment, the area of the front surface 12a of the convex lens 12, which is positioned on the side corresponding to the opposite lane with respect to a vertical plane including the optical axis Ax, is formed as the horizontal diffusion area Z1. Further, the area of the front surface of the convex lens, which is positioned on the side corresponding to the vehicle's own lane, is formed as the oblique diffusion area Z2. Accordingly, it is possible to obtain the following advantages.

From the standpoint of the formation of the horizontal cut-off line CL1 having a certain length, it is advantageous that the horizontal diffusion area Z1 be formed so that the amount of light emitted toward the opposite lane is larger than the amount of light emitted toward the vehicle's own lane. In this case, if the area, which is positioned on the side corresponding to the vehicle's own lane with respect to the vertical plane including the optical axis Ax, is formed as the horizontal diffusion area Z1, the refraction angle of the light emitted from the front surface 12a of the convex lens 12 is increased. Accordingly, a ratio of the light, which is internally reflected by the front surface 12a, is increased, so that the loss of the luminous flux of a light source is generated as much as the increase of the ratio. In this respect, if the area, which is positioned on the side corresponding to the opposite lane with respect to the vertical plane including the optical axis Ax, is formed as the horizontal diffusion area Z1, the refraction angle of the light emitted from the front surface 12a of the convex lens 12 is decreased. Accordingly, a ratio of the light, which is internally reflected by the front surface 12a, is decreased, so that it is possible to improve the use efficiency of the luminous flux of a light source.

Likewise, from the standpoint of the formation of the oblique cut-off line CL2 having a certain length, it is advantageous that the oblique diffusion area Z2 be formed so that the amount of light emitted toward the vehicle's own lane is larger than the amount of light emitted toward the opposite lane. In this case, if the area, which is positioned on the side corresponding to the opposite lane with respect to the vertical plane including the optical axis Ax, is formed as the oblique diffusion area, the refraction angle of the light emitted from the front surface 12a of the convex lens 12 is increased. Accordingly, a ratio of the light, which is internally reflected by the front surface 12a, is increased, so that the loss of the luminous flux of a light source is generated as much as the increase of the ratio. In this respect, if the area, which is positioned on the side corresponding to the vehicle's own lane with respect to the vertical plane including the optical axis Ax, is formed as the oblique diffusion area Z2, the refraction angle of the light emitted from the front surface 12a of the convex lens 12 is decreased. Accordingly, a ratio of the light, which is internally reflected by the front surface 12a, is decreased, so that it is possible to improve the use efficiency of the luminous flux of a light source.

In addition, according to this embodiment, a part of the oblique diffusion area Z2 is formed as downward diffusion areas Z2a and Z2b for emitting the light, which is emitted from the light-emitting element 14 and reaches the area Z2, as the light that is diffused downward. Accordingly, it is possible to increase the brightness of a portion of the low-beam light-distribution pattern PL, which is positioned near the vehicle's own lane from the elbow point E. Therefore, it is possible to easily form the hot zone HZ that has a desired size and shape.

In addition, in the vehicle lamp 10 according to this embodiment, the additional lens 22, which is formed integrally with the convex lens 12 so as to surround the convex lens 12 in the shape of a band, is disposed around the convex lens 12. Further, the additional lens 22 includes the incident surface 22b, the reflection surface 22c, and the emitting surface 22a. The incident surface makes the light emitted from the light-emitting element 14 enter the additional lens 22 so that the light is refracted so as to be separated from the optical axis Ax. The reflection surface internally reflects the light, which enters from the incident surface 22b, toward the front side. The emitting surface emits the light, which is internally reflected by the reflection surface 22c, toward the front side as horizontally diffused light. Accordingly, the vehicle lamp makes most of the light emitted from the light-emitting element 14, which travels toward a space near the convex lens 12, enter the additional lens 22, and can emit the light toward the front side through the reflection surface 22c and the emitting surface 22a. Accordingly, it is possible to additionally form the additional light-distribution pattern PB by the light, which is emitted from the additional lens 22, on the basic light-distribution pattern PA that is formed by the light emitted from the convex lens 12. Therefore, it is possible to further effectively use the luminous flux of a light source.

In this case, because the additional lens 22 is formed integrally with the convex lens so as to surround the convex lens 12 in the shape of a band, it is possible to always maintain a constant positional relationship between the additional lens 22 and the convex lens 12. Accordingly, it is possible to accurately control the deflection of the light, which is emitted from the light-emitting element 14, by the additional lens 22.

Further, in the vehicle lamp 10 according to this embodiment, the image of the light-emitting chip 14a is formed on the reflection surface 22c of the additional lens 22 by the light that is emitted from the light-emitting element 14 and reaches an arbitrary point on the incident surface 22b of the additional lens 22. However, the additional lens 22 is divided into eight fan-shaped areas 22A to 22H in the circumferential direction with respect to the optical axis Ax, for each angular range where the corner point positioned on the peripheral edge of the light-emitting chip 14a corresponding to the point, which is positioned at the uppermost end of the image of the light-emitting chip 14a, becomes the same corner point. Each of the eight fan-shaped areas 22A to 22H is formed to emit the light, which is emitted from the corner point, toward the front side as the light that is parallel to one another in the vertical direction among the fan-shaped areas 22A to 22H. Accordingly, it is possible to obtain the following advantages.

The additional light-distribution pattern PB, which is formed by the light emitted from the additional lens 22, is a light-distribution pattern where the light-distribution patterns formed by the light emitted from the eight fan-shaped areas 22A to 22H are superimposed. In this case, the additional lens 22 is formed to emit the light, which is emitted from the light-emitting element 14 and internally reflected by the reflection surface 22c of the additional lens, toward the front side as horizontally diffused light. However, as for the vertical direction, the additional lens is formed to emit the light, which is emitted from the corner points of the light-emitting chip 14a, toward the front side as the light that is parallel to each other. Accordingly, the heights of the upper edges of the light-distribution patterns, which are formed by the light emitted from the fan-shaped areas 22A to 22H, are unified. For this reason, the upper edge PBa of the additional light-distribution pattern PB, which is formed by the light emitted from the additional lens 22, forms a horizontal cut-off line having high definition.

Further, the upper edge PA1a of the light-distribution pattern PA1 of the basic light-distribution pattern PA, which is formed by the light emitted from the convex lens 12, forms the horizontal cut-off line CL1. The upper edge PA2a of the light-distribution pattern PA2 thereof forms a horizontal cut-off line having high definition. Accordingly, if the additional light-distribution pattern PB is combined with the basic light-distribution pattern, the low-beam light-distribution pattern PL formed by the entire vehicle lamp may be a light-distribution pattern that has horizontal and oblique cut-off lines CL1 and CL2 having high definition.

According to this embodiment, even when the direct-projection type vehicle lamp 10 that uses the light-emitting element 14 as a light source forms a light-distribution pattern that has a cut-off line at the upper end thereof, it is possible to improve the use efficiency of the luminous flux of a light source. In addition, if the additional light-distribution pattern PB is additionally formed, it is possible to improve the use efficiency of the luminous flux of a light source and to additionally form the horizontal cut-off line PBa having high definition.

Further, in this embodiment, the cross-sectional shape of each of the eight fan-shaped areas 22A to 22H taken along a plane including an axis line Ax1, which passes through the emission center O of the light-emitting element 14 and is parallel to the optical axis Ax, is set to the same shape. Further, these eight fan-shaped areas 22A to 22H are disposed so that adjacent fan-shaped areas 22A to 22H are shifted from the axis line Ax1 in a radial direction. Accordingly, if the shift amount of each of the fan-shaped areas 22A to 22H is appropriately adjusted, it is possible to unify the height of the upper edge of the light-distribution pattern that is formed by the light emitted from each of the fan-shaped areas 22A to 22H. Further, if the optical design of the additional lens 22 may be easily performed using this, it is possible to obtain the above-mentioned advantages.

A second embodiment of the invention will be described below.

Figure 11:
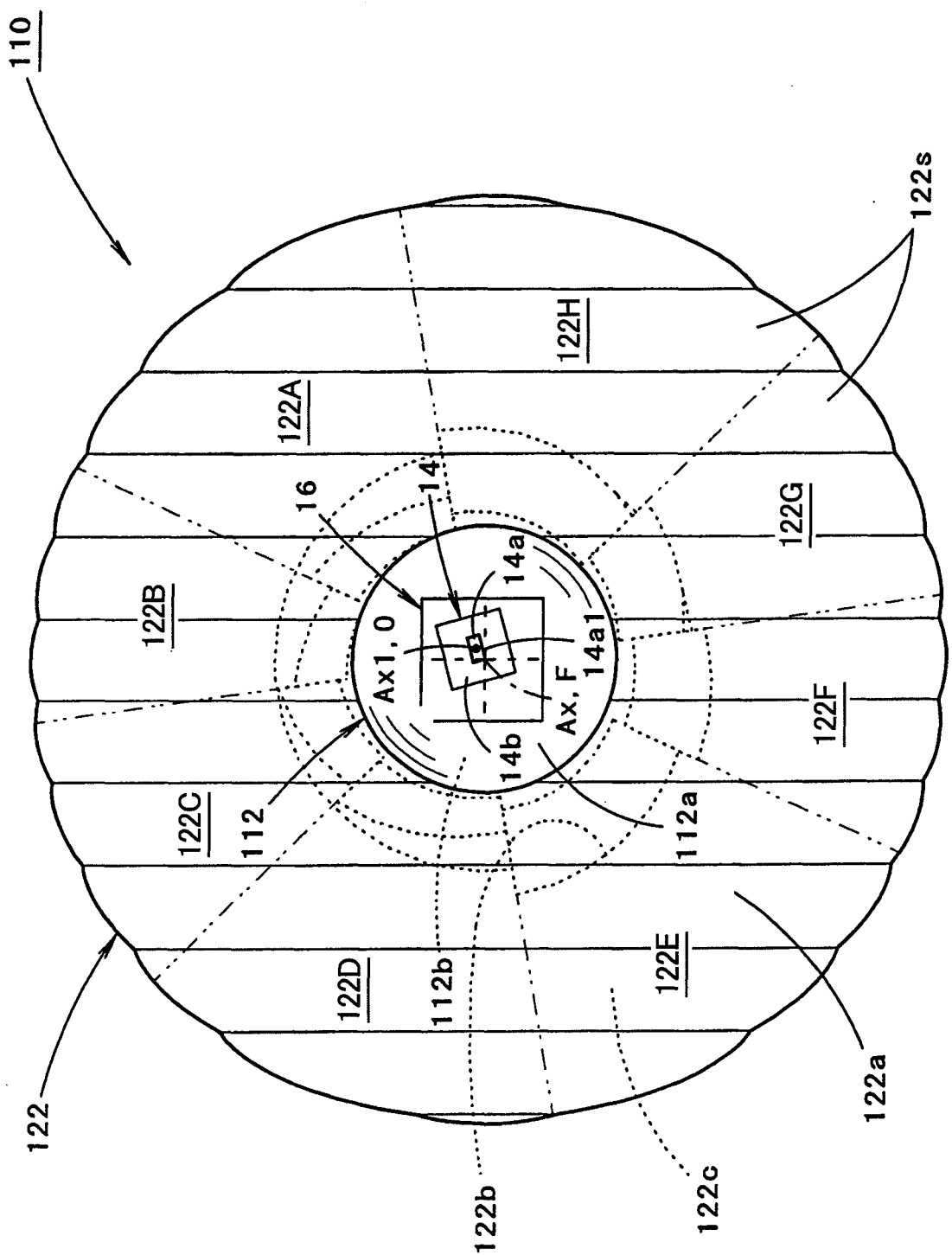
FIG. 11 is a front view of a vehicle lamp according to a second embodiment of the invention.

FIG. 11 is a front view of a vehicle lamp 110 according to this embodiment. Further, FIG. 12 is a perspective view of a convex lens 112 and an additional lens 122 of the vehicle lamp 110.

Figure 12:
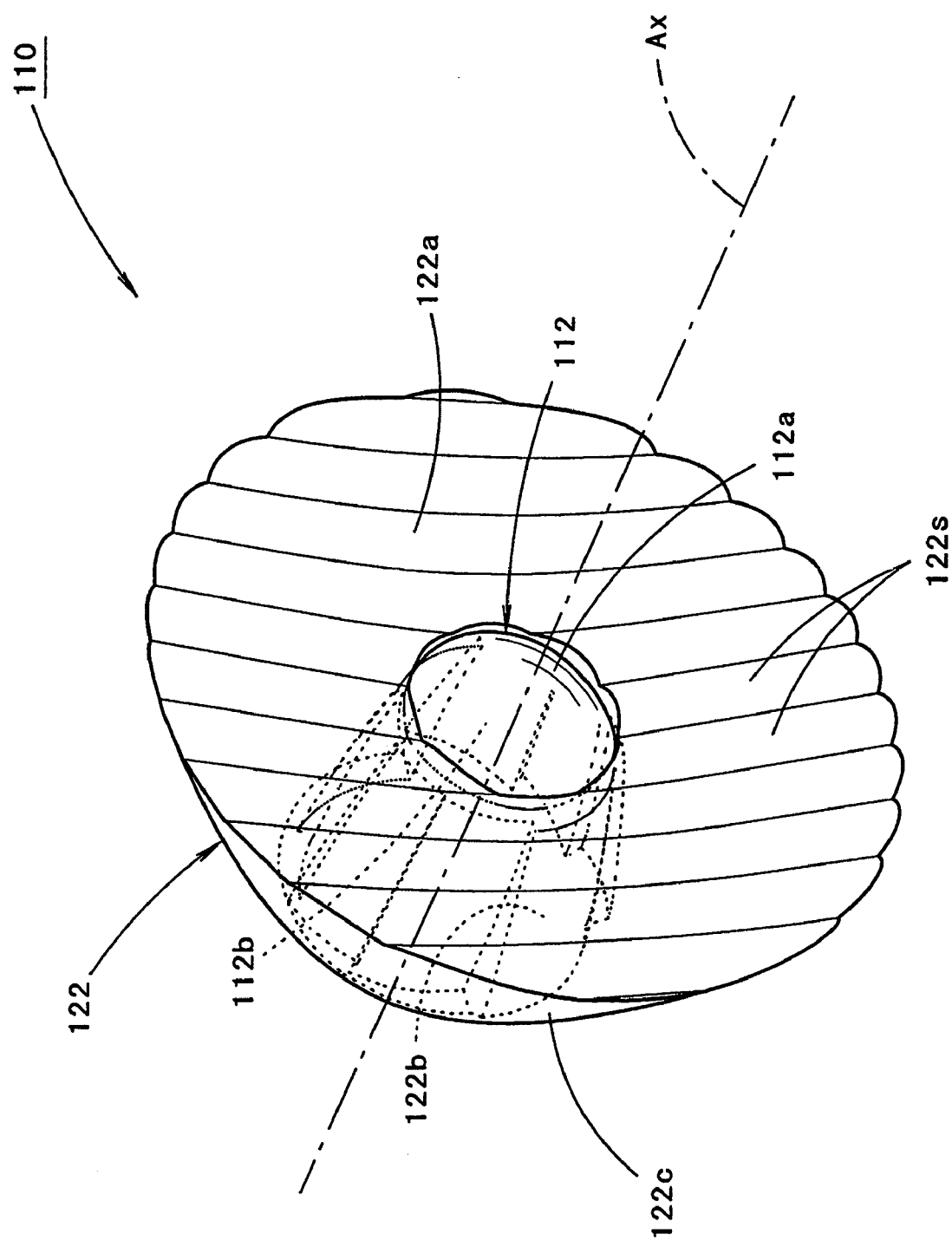
FIG. 12 is a perspective view showing an additional lens and a convex lens of the vehicle lamp according to the second embodiment of the invention.

As shown in FIGS. 11 and 12, the basic configuration of a vehicle lamp 110 according to this embodiment is the same as that of the vehicle lamp 10 according to the first embodiment. However, the shapes of a convex lens 112 and an additional lens 122 of the second embodiment are different from those of the first embodiment.

Specifically, the diameter of the convex lens 112 of the vehicle lamp 110 according to this embodiment is smaller than that of the convex lens 12 of the first embodiment. However, the optical function of the convex lens 112 is the same as that of the convex lens 12 of the first embodiment.

Meanwhile, the diameter of the additional lens 122 of the vehicle lamp 110 according to this embodiment is larger than that of the additional lens 22 of the first embodiment. However, the optical function of the additional lens 122 is substantially the same as that of the additional lens 22 of the first embodiment.

That is, like the additional lens 22 of the first embodiment, the additional lens 122 also includes an incident surface 122b, a reflection surface 122c, and an emitting surface 122a. The incident surface 122b makes the light emitted from a light-emitting element 14 enter the additional lens 122 so that the light is refracted so as to be separated from an optical axis Ax. The reflection surface 122c internally reflects the light, which enters from the incident surface 122b, toward the front side. The emitting surface 122a emits the light, which is internally reflected by the reflection surface 122c, toward the front side as horizontally diffused light.

In this case, the reflection surface 122c of the additional lens 122 is formed so as to perform the internal reflection by total reflection. A plurality of diffusing lens elements 122s is formed on the emitting surface 122a of the additional lens 122 in the shape of a vertical stripe.

In addition, like the additional lens 22 of the first embodiment, the additional lens 122 is also divided into eight fan-shaped areas 122A, 122B, 122C, 122D, 122E, 122F, 122G, and 122H in the circumferential direction with respect to the optical axis Ax. However, the reflection surface 122c for these eight fan-shaped areas 122A to 122H is formed of a single rotary-curved surface that has an axis line Ax1 as a center.

In this case, like the eight fan-shaped areas 22A to 22H of the first embodiment, these eight fan-shaped areas 122A to 122H are divided for each angular range where the corner point positioned on the peripheral edge of the light-emitting chip 14a corresponding to the point, which is positioned at the uppermost end of the image of the light-emitting chip 14a, becomes the same corner point. In order to achieve this, the incident surface 122b for these eight fan-shaped areas 122A to 122H is formed of different curved surfaces between adjacent fan-shaped areas 122A to 122H.

Further, each of these eight fan-shaped areas 122A to 122H is formed to emit the light, which is emitted from the corner point, toward the front side as the light that is parallel to one another in the vertical direction among the fan-shaped areas 122A to 122H.

Accordingly, the heights of the upper edges of the light-distribution patterns, which are formed by the light emitted from the fan-shaped areas 122A to 122H, are unified. For this reason, the additional light-distribution pattern, which is formed by the light emitted from the additional lens 122, has a horizontal cut-off line having high definition at the upper end thereof.

When the configuration of this embodiment is employed as described above, it is possible to obtain substantially the same advantages as the first embodiment.

In addition, according to this embodiment, the reflection surface 122c of the additional lens 122 is formed of a single rotary-curved surface that has the optical axis Ax as a center. Accordingly, if the reflection surface 122c of the additional lens 122 may be accurately formed during the manufacture of the convex lens 112 and the additional lens 122, it is possible to obtain the above-mentioned advantages.

Meanwhile, in each of the embodiments, the light-emitting chip 14a of the light-emitting element 14 having a laterally elongated rectangular light-emitting surface has been described, but a light-emitting chip having a square or vertically elongated rectangular light-emitting surface may be used.

Further, in each of the embodiments, the entire area of the front surface, which is positioned on the side corresponding to the opposite lane with respect to the vertical plane including the optical axis Ax, has been formed as the horizontal diffusion area Z1, and the entire area of the front surface, which is positioned on the side corresponding to the vehicle's own lane with respect to the vertical plane including the optical axis Ax, has been formed as the oblique diffusion area Z2. However, a part of the area of the horizontal diffusion area Z1 or the oblique diffusion area Z2 may be formed to have a different configuration (for example, the configuration where the shape of the front surface of a common plane-convex aspherical lens is maintained as it is and the reverse projection image Io is directly projected onto the virtual vertical screen).

In addition, in each of the embodiments, the rear surface 12b or 112b of the convex lens 12 or 112 has been formed of a flat surface, but may be formed of a convex surface or a concave surface.

Further, in each of the embodiments, the additional lens 22 or 122 has been disposed so as to surround the convex lens 12 or 112 in the shape of a band over the entire circumference of the convex lens, and has been divided into eight fan-shaped areas 22A to 22H or 122A to 122H in the circumferential direction with respect to the optical axis Ax. However, only a part of these eight fan-shaped areas 22A to 22H or 122A to 122H may be disposed to surround the convex lens 12 or 112 over a predetermined angular range.

In each of the embodiments, the basic light-distribution pattern PA and the additional light-distribution pattern PB, which are formed by the light emission of the vehicle lamp 10 or 110, have been formed as a part of the low-beam light-distribution patterns PL and PL2 for left light distribution. If the left and right sides of each of the vehicle lamps 10 and 110 are reversed even when the basic light-distribution pattern and the additional light-distribution pattern have been formed as a part of the low-beam light-distribution patterns PL and PL2 for right light distribution, it is possible to obtain the same advantages as each of the embodiments.

As described above, the vehicle lamp according to the invention forms a light-distribution pattern, which has cut-off lines at the upper end thereof, by controlling the deflection of direct light emitted from the light-emitting element, which includes the light-emitting chip having a rectangular light-emitting surface, with the convex lens. However, the light-emitting element is disposed to face the front side so that the lower edge of the light-emitting chip of the light-emitting element is positioned on a plane including the optical axis and one end point of the lower edge is positioned at the rear focal point of the convex lens. Accordingly, it is possible for one or more embodiments to obtain one or more the following advantages.

Because the light-emitting element is disposed in the vicinity of the rear focal point of the convex lens so as to face the front side, the reverse projection image of the light-emitting chip is formed on the virtual vertical screen that is positioned ahead of the vehicle lamp. However, in this case, the lower edge of the light-emitting chip is positioned on a plane including the optical axis, and one end point of the lower edge is positioned at the rear focal point of the convex lens. Accordingly, if the convex lens is a common convex lens, the reverse projection image of the light-emitting chip is formed so that one end point of the upper edge of the reverse projection image is positioned at the intersection between the virtual vertical screen and the optical axis on the virtual vertical screen and the upper edge thereof is positioned on a horizontal line passing through the intersection or on an inclined line inclined with respect to the horizontal line.

Therefore, if the surface shape of the front surface of the convex lens is appropriately set and the deflected diffusion of the direct light emitted from the light-emitting element is controlled in the horizontal direction and a direction that is inclined upward, it is possible to form a light-distribution pattern, which has a horizontal or oblique cut-off line or both horizontal and oblique cut-off lines. In addition, it is possible to form the cut-off lines without blocking a part of the direct light emitted from the light-emitting element by a shade unlike in the related art. Accordingly, it is possible to effectively use the luminous flux of a light source.

In addition, in the vehicle lamp according to the invention, an additional lens is disposed around the convex lens so as to surround the convex lens in the shape of a band. Further, the additional lens includes an incident surface that makes the light emitted from the light-emitting element enter the additional lens so that the light is refracted so as to be separated from the optical axis; a reflection surface that internally reflects the light, which enters from the incident surface, toward the front side; and an emitting surface that emits the light, which is internally reflected by the reflection surface, toward the front side as horizontally diffused light. Accordingly, the vehicle lamp makes most of the light emitted from the light-emitting element, which travels toward a space near the convex lens, enter the additional lens, and can emit the light toward the front side through the reflection surface and the emitting surface. Accordingly, it is possible to additionally form the additional light-distribution pattern by the light, which is emitted from the additional lens, on the basic light-distribution pattern that is formed by the light emitted from the convex lens. Therefore, it is possible to further effectively use the luminous flux of a light source.

Further, in the vehicle lamp according to one or more embodiments of the invention, the image of the light-emitting chip is formed on the reflection surface of the additional lens by the light that is emitted from the light-emitting element and reaches an arbitrary point on the incident surface of the additional lens. However, in this case, the additional lens is divided into a plurality of fan-shaped areas in the circumferential direction with respect to the optical axis, for each angular range where the corner point positioned on the peripheral edge of the light-emitting chip corresponding to the point, which is positioned at the uppermost end of the image of the light-emitting chip, becomes the same corner point. Further, each of the fan-shaped areas is formed to emit the light, which is emitted from the corner point, toward the front side as the light that is parallel to one another in the vertical direction among the fan-shaped areas. Accordingly, it is possible to obtain the following advantages.

The additional light-distribution pattern, which is formed by the light emitted from the additional lens, is a light-distribution pattern where the light-distribution patterns formed by the light emitted from the plurality of fan-shaped areas are superimposed. In this case, the additional lens is formed to emit the light, which is emitted from the light-emitting element and internally reflected by the reflection surface of the additional lens, toward the front side as the light horizontally diffused light. However, as for the vertical direction, the additional lens is formed to emit the light, which is emitted from the corner points of the light-emitting chip, toward the front side as the light that is parallel to each other. Accordingly, the heights of the upper edges of the light-distribution patterns, which are formed by the light emitted from the fan-shaped areas, are unified. For this reason, the upper edge of the additional light-distribution pattern, which is formed by the light emitted from the additional lens, forms a horizontal cut-off line having high definition.

Accordingly, the light-distribution pattern formed by the entire vehicle lamp have a cut-off line of the basic light-distribution pattern that is formed by the light emitted from the convex lens, and a horizontal cut-off line of the additional light-distribution pattern that is formed by the light emitted from the additional lens.

In this case, if the cut-off line of the basic light-distribution pattern formed by the light emitted from the convex lens is formed as an oblique cut-off line, the light-distribution pattern formed by the entire vehicle lamp may be the light-distribution pattern having horizontal and oblique cut-off lines.

Further, if the cut-off line of the basic light-distribution pattern formed by the light emitted from the convex lens is formed as a horizontal cut-off line, the light-distribution pattern formed by the entire vehicle lamp may be the light-distribution pattern that has a horizontal cut-off line having higher definition.

According to embodiments of the invention, even when the direct-projection type vehicle lamp that uses the light-emitting element as a light source forms a light-distribution pattern that has a cut-off line at the upper end thereof, it is possible to improve the use efficiency of the luminous flux of a light source. In addition, if the additional light-distribution pattern is additionally formed, it is possible to further improve the use efficiency of the luminous flux of a light source and to additionally form the horizontal cut-off line having high definition.

In the above-mentioned configuration, the cross-sectional shapes of the incident surface and the reflection surface of each of the plurality of fan-shaped areas taken along a plane including an axis line, which is parallel to the optical axis passing through an emission center of the light-emitting element, are set to the same shape. Then, the plurality of fan-shaped areas are disposed so that adjacent fan-shaped areas are shifted from the axis line in a radial direction. Accordingly, if the shift amount of each of the fan-shaped areas is appropriately adjusted, it is possible to unify the height of the upper edge of the light-distribution pattern that is formed by the light emitted from each of the fan-shaped areas. Further, if the optical design of the additional lens may be easily performed using this, it is possible to obtain the above-mentioned advantages.

Meanwhile, in the above-mentioned configuration, the reflection surface of each of the fan-shaped areas is formed of a single rotary-curved surface (that is, a rotationally-symmetrical curved surface) having an axis line, which is parallel to the optical axis passing through an emission center of the light-emitting element, as a center, and the incident surface of each of the fan-shaped areas is formed of different curved surfaces between adjacent fan-shaped areas. Accordingly, it is possible to reduce the number of concave and convex portions of the additional lens. Therefore, if the reflection surface of the additional lens may be accurately formed during the manufacture of the additional lens, it is possible to obtain the above-mentioned advantages.

In the above-mentioned configuration, the following structure may be employed as the specific disposition of the light-emitting element and the specific structure of the convex lens.

That is, according to a first structural example, the lower edge of the light-emitting chip of the light-emitting element may be positioned on a horizontal plane including the optical axis, and an end point of the lower edge corresponding to the vehicle's own lane is positioned at the rear focal point of the convex lens. A part of the area of the front surface of the convex lens may be formed as a horizontal diffusion area for emitting the light, which is emitted from the light-emitting element and reaches the area, as light that is diffused in the horizontal direction. Further, the other part of the area of the front surface thereof may be formed as an oblique diffusion area for emitting the light, which is emitted from the light-emitting element and reaches the area, as light diffused in an oblique direction that is inclined upward toward the vehicle's own lane with respect to the horizontal direction by a predetermined angle.

In this case, a first light-distribution pattern extending in the horizontal direction is formed on the virtual vertical screen by the light emitted from the horizontal diffusion area. Further, a second light-distribution pattern, which extends in an oblique direction inclined upward toward the vehicle's own lane with respect to the horizontal direction by a predetermined angle, is formed on the virtual vertical screen by the light emitted from the oblique diffusion area. Furthermore, a light-distribution pattern, which has horizontal and oblique cut-off lines at the upper end thereof, is formed as a composite light-distribution pattern of the first and second light-distribution patterns.

In this case, the first light-distribution pattern is formed as a light-distribution pattern that is obtained by elongating the reverse projection image of the light-emitting chip in the horizontal direction, but the lower edge of the light-emitting chip extends from the rear focal point of the convex lens in the horizontal direction. Accordingly, the upper edge of the first light-distribution pattern has an extremely high contrast ratio, so that the horizontal cut-off line also has high definition.

Further, according to a second structural example, the lower edge of the light-emitting chip of the light-emitting element may be positioned on an inclined plane that is inclined upward toward the vehicle's own lane with respect to the horizontal plane including the optical axis by a predetermined angle, and an end point of the lower edge corresponding to the opposite lane may be positioned at the rear focal point of the convex lens. A part of the area of the front surface of the convex lens may be formed as a horizontal diffusion area for emitting the light, which is emitted from the light-emitting element and reaches the area, as light that is diffused in the horizontal direction. Further, the other part of the area of the front surface thereof may be formed as an oblique diffusion area for emitting the light, which is emitted from the light-emitting element and reaches the area, as light diffused in an oblique direction that is inclined upward toward the vehicle's own lane with respect to the horizontal direction by a predetermined angle.

In this case, the first light-distribution pattern extending in the horizontal direction is formed on the virtual vertical screen by the light emitted from the horizontal diffusion area. Further, a second light-distribution pattern, which extends in an oblique direction inclined upward toward the vehicle's own lane with respect to the horizontal direction by a predetermined angle, is formed on the virtual vertical screen by the light emitted from the oblique diffusion area. Furthermore, a light-distribution pattern, which has horizontal and oblique cut-off lines at the upper end thereof, is formed as a composite light-distribution pattern of the first and second light-distribution patterns.

In this case, the second light-distribution pattern is formed as a light-distribution pattern that is obtained by elongating the reverse projection image of the light-emitting chip in an oblique direction, which is inclined upward toward the vehicle's own lane with respect to the horizontal direction by a predetermined angle, but the lower edge of the light-emitting chip extends from the rear focal point of the convex lens in the oblique direction. Accordingly, the upper edge of the second light-distribution pattern has an extremely high contrast ratio, so that the oblique cut-off line also has high definition.

The numerical values, which have been described as specifications in each of the embodiments, are merely illustrative, and may be appropriately set to different values.

While the present invention has been shown and described with reference to certain exemplary embodiments thereof, other implementations are within the scope of the claims. It will be understood by those skilled in the art that various changes in form and details may be made therein without departing from the spirit and scope of the invention as defined by the appended claims.

The invention claimed is:

1. A vehicle lamp comprising:
   a convex lens disposed on an optical axis extending in a longitudinal direction of a vehicle;
   a light-emitting element disposed near a rear focal point of the convex lens; and
   an additional lens disposed so as to surround the convex lens,
   wherein the light-emitting element comprises:
      a light-emitting chip having a light-emitting surface;
   wherein light emitted from the light-emitting element passes through the convex lens to form a light-distribution pattern having cut-off lines at the upper end thereof, and
   wherein the light-emitting element is disposed to face a front side of the vehicle such that a lower edge of the light-emitting chip is positioned on a plane including the optical axis and one end point of the lower edge is positioned at the rear focal point,
   wherein the additional lens comprises:
      an incident surface where the light emitted from the light-emitting element enters the additional lens such that the light is refracted to be separated from the optical axis;
      a reflection surface where the light from the incident surface is internally reflected toward the front side; and
      an emitting surface where the light from the reflection surface is converted into horizontally diffused light and is emitted toward the front side, and
   wherein the additional lens is divided into a plurality of fan-shaped areas for each angular range where a corner point of the light-emitting chip, which is positioned at an uppermost end of an image of the light-emitting chip formed on the reflection surface by the light emitted from the light-emitting element, becomes the same corner point.

2. The vehicle lamp according to claim 1,
   wherein the cross-sectional shapes of the incident surface and the reflection surface of each of the fan-shaped areas taken along a plane including an axis line, which is parallel to the optical axis and passes through an emission center of the light-emitting element, are set to the same shape, and
   wherein the fan-shaped areas are disposed such that adjacent fan-shaped areas are shifted from the axis line in a radial direction.

3. The vehicle lamp according to claim 1,
   wherein the reflection surface of each of the fan-shaped areas is formed of a single rotary-curved surface where an axis line, which is parallel to the optical axis and passes through an emission center of the light-emitting element, is set as a center, and
   wherein the incident surface of each of the fan-shaped areas is formed of different curved surfaces between adjacent fan-shaped areas.

4. The vehicle lamp according to claim 1, wherein each of the fan-shaped areas is configured to emit the light, which is emitted from the corner point, toward the front side such that the light is parallel in a vertical direction of the vehicle.

5. The vehicle lamp according to claim 1, wherein a lower edge of the light-emitting chip is positioned on an inclined plane that is inclined upward toward the vehicle's own lane with respect to a horizontal plane including the optical axis by a predetermined angle.

6. The vehicle lamp according to claim 1, wherein an end point of the lower edge corresponding to an opposite lane of the vehicle is positioned at a rear focal point of the convex lens.

7. The vehicle lamp according to claim 1, wherein a part of an area of a front surface of the convex lens is formed as a horizontal diffusion area.

8. The vehicle lamp according to claim 1, wherein the light-emitting surface of the light emitting chip has a shape that is one of laterally elongated, vertically elongated, or square.

9. A vehicle lamp comprising:
   a convex lens disposed on an optical axis extending in a longitudinal direction of a vehicle;
   a light-emitting element disposed near a rear focal point of the convex lens; and
   an additional lens disposed so as to surround the convex lens,
   wherein the light-emitting element comprises:
      a light-emitting chip having a light-emitting surface;

wherein light emitted from the light-emitting element passes through the convex lens to form a light-distribution pattern having cut-off lines at the upper end thereof, and wherein the light-emitting element is disposed to face a front side of the vehicle such that a lower edge of the light-emitting chip is positioned on a plane including the optical axis and one end point of the lower edge is positioned at the rear focal point, wherein the additional lens comprises:
  an incident surface where the light emitted from the light-emitting element enters the additional lens such that the light is refracted to be separated from the optical axis;
  a reflection surface where the light from the incident surface is internally reflected toward the front side; and
  an emitting surface where the light from the reflection surface is converted into horizontally diffused light and is emitted toward the front side, wherein the additional lens is divided into a plurality of fan-shaped areas for each angular range where a corner point of the light-emitting chip, which is positioned at an uppermost end of an image of the light-emitting chip formed on the reflection surface by the light emitted from the light-emitting element, becomes the same corner point, wherein each of the fan-shaped areas is configured to emit the light, which is emitted from the corner point, toward the front side such that the light is parallel in a vertical direction of the vehicle, wherein the cross-sectional shapes of the incident surface and the reflection surface of each of the fan-shaped areas taken along a plane including an axis line, which is parallel to the optical axis and passes through an emission center of the light-emitting element, are set to the same shape, wherein the fan-shaped areas are disposed such that adjacent fan-shaped areas are shifted from the axis line in a radial direction, wherein the reflection surface of each of the fan-shaped areas is formed of a single rotary-curved surface where an axis line, which is parallel to the optical axis and passes through an emission center of the light-emitting element, is set as a center, and wherein the incident surface of each of the fan-shaped areas is formed of different curved surfaces between adjacent fan-shaped areas.

10. The vehicle lamp according to claim 9, wherein the light-emitting surface of the light emitting chip has a shape that is one of laterally elongated, vertically elongated, or square.

11. The vehicle lamp according to claim 10, wherein a lower edge of the light-emitting chip is positioned on an inclined plane that is inclined upward toward the vehicle's own lane with respect to a horizontal plane including the optical axis by a predetermined angle.

12. The vehicle lamp according to claim 11, wherein an end point of the lower edge corresponding to an opposite lane of the vehicle is positioned at a rear focal point of the convex lens.

13. The vehicle lamp according to claim 12, wherein a part of an area of a front surface of the convex lens is formed as a horizontal diffusion area.

* * * * *